United States Patent [19]
Main

[11] Patent Number: 5,402,369
[45] Date of Patent: Mar. 28, 1995

[54] METHOD AND APPARATUS FOR DIGITAL MULTIPLICATION BASED ON SUMS AND DIFFERENCES OF FINITE SETS OF POWERS OF TWO

[75] Inventor: David R. Main, Boulder Creek, Calif.

[73] Assignee: The 3DO Company, San Mateo, Calif.

[21] Appl. No.: 88,045

[22] Filed: Jul. 6, 1993

[51] Int. Cl.⁶ .............................................. G06F 7/52
[52] U.S. Cl. .................................. 364/757; 364/754
[58] Field of Search ................ 364/754, 757, 759–760

[56] References Cited

U.S. PATENT DOCUMENTS

| | | | |
|---|---|---|---|
| 4,864,529 | 9/1989 | Shah et al. | 364/760 |
| 5,001,663 | 3/1991 | Parulski et al. | 364/760 |
| 5,117,385 | 5/1992 | Gee | 364/757 |
| 5,243,552 | 9/1993 | Asakura | 364/757 |

FOREIGN PATENT DOCUMENTS 1-273413 11/1989 Japan .
3-267809 11/1991 Japan .

*Primary Examiner*—Tan V. Mai
*Attorney, Agent, or Firm*—Fliesler, Dubb, Meyer & Lovejoy

[57] ABSTRACT

A method and apparatus is disclosed for digital multiplication based on sums and differences of finite sets of powers of two. It is observed that for a given multiplicand signal A, multiples of the form A·P/Q can be defined by adding or subtracting term signals when each term signal ($T_i, T_j$) is selectively made representative either of the multiplicand (A) multiplied by a power of two ($T = A*2^{-i}$) or representative of a nullity ($T = 0*A$). A mapping unit is provided for controlling responsive barrel shifters and for controlling one or more responsive adder/subtractor units so that the resultant system has a transfer function equivalent to that of an n-bits by m-bits multiplier.

38 Claims, 7 Drawing Sheets

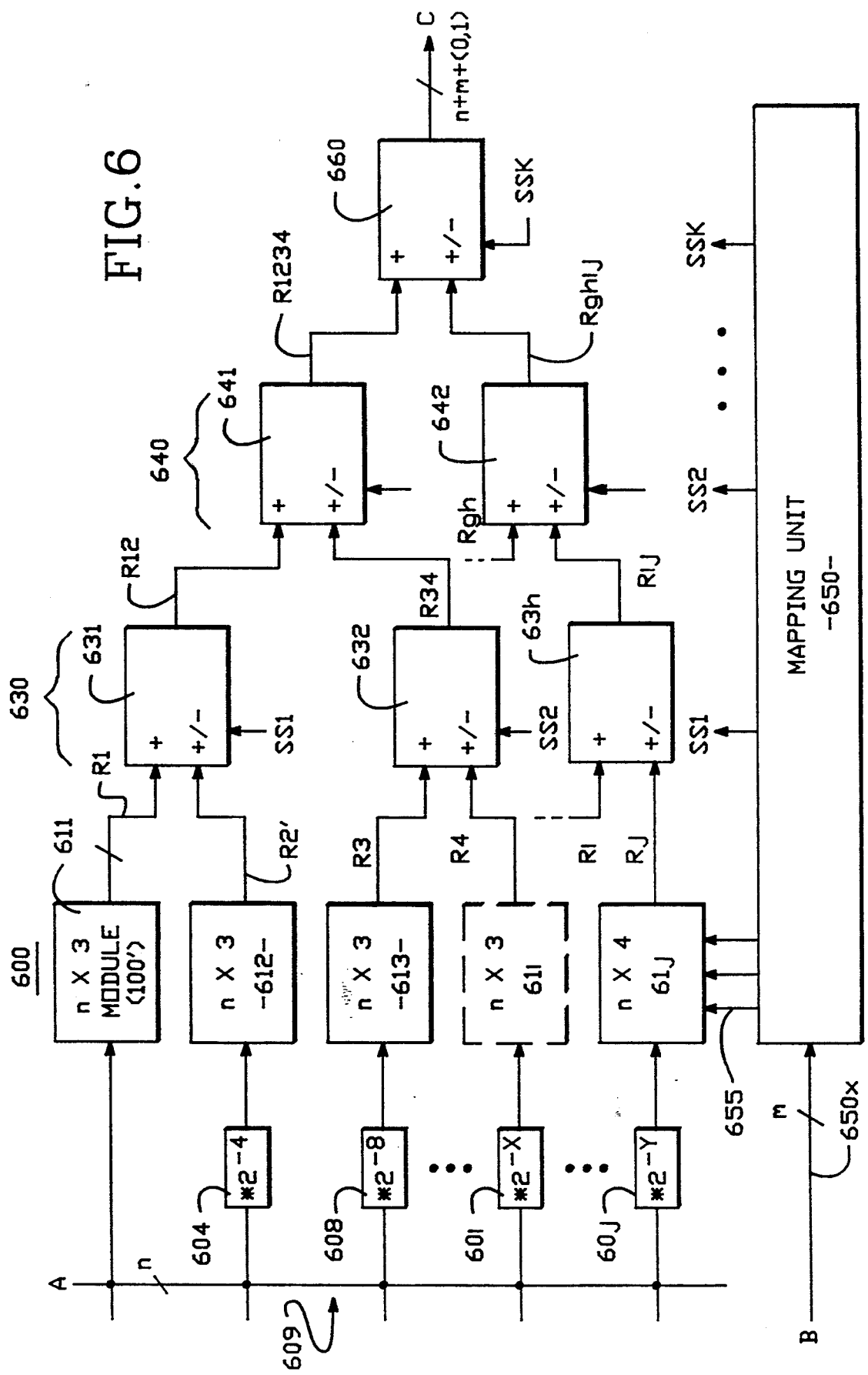

METHOD AND APPARATUS FOR DIGITAL MULTIPLICATION BASED ON SUMS AND DIFFERENCES OF FINITE SETS OF POWERS OF TWO

BACKGROUND

1. Field of the Invention

The invention relates generally to digital circuitry. The invention relates more specifically to an improved method and apparatus for digital multiplication based on shifting of binary-coded data.

2. Description of the Related Art

Use of multiplication is widespread in digital electronic circuits.

The basic AND gate inherently performs a 1-bit by 1-bit, binary-coded multiplication. Larger sized multiplications in which an n-bit wide multiplicand signal (A) is multiplied by an m-bit wide multiplier signal (B) to produce a binary-coded result signal (C=A·B) that is k-bits wide, where the number of result bits k can be substantially greater than 1, are also ubiquitous. (In most cases, k=m+n. Sometimes the result can be expressed with less than m+n bits through the use of truncation with or without round-off error correction.)

Examples of reliance on digital multiplication may be found in fields such as digital signal processing (DSP) and neural networks. Different proportionality "weights" are routinely assigned in these fields to various parameter signals in order to provide a desired DSP filter function or neural net pattern. Parameter weighting is typically performed by digitally multiplying a parameter signal by a corresponding weight coefficient signal. In the case of real-time adaptive filtering operations and the like, input signals arrive at real-time speed (which can be quite fast). Weighting coefficients may have to change at real-time speed in response to rapidly changing input or other conditions. As a consequence, parameter weighting operations may also need to complete in relatively short time.

Digital multiplication is, of course, also found in the field of general purpose computers. Phrases such as "scaling by a factor", "modulating with another signal" and "attenuating by a factor" are often used in the field of signal processing as equivalents for the operation of generating a result signal that is coded to represent the multiplication of values represented by two or more input signals.

Quite often, one or more of the multiplicand (A), the multiplier (B), and the result signal (C=A·B) represent a physical quantity such as, but not limited to: (a) X-ray or other tomography measurement signals that are being digitally processed as they are gathered in real time, or after collection, for purposes of improving image quality; (b) heartbeat or other medically-related measurements that are being collected in real time and digitally processed for purposes of providing immediate diagnosis and treatment; (c) audio or ultrasonic signals that are being pre-processed in real-time prior to their production as physical sound waves or that are being post-processed after reception of physical counterparts; (d) video signals that are being pre-processed in real-time prior to production as physical light images or post-processed after reception of physical counterparts; and (e) digital telecommunication signals, such as used in modems and facsimile machines, where the digital telecommunication signals pass through a digital multiplication process as part of a pre-emphasis (modulation) operation or post-emphasis (de-modulation) operation or as part of an error-detection and/or error-correction operation or as part of a data compression or decompression operation.

In many instances, several multiplication operations need to be carried out in a mass-produced circuit. Preferably, such a circuit should be of low cost, compact and composed of one or as small a number of integrated circuit (IC) chips as is economically and technologically practical. It is often desirable to squeeze one or more multiplier circuits onto a single monolithic integrated circuit (IC) chip in a manner which minimizes circuit size, complexity and cost, and gives each IC chip a relatively high level of functionality and performance. Smaller circuit size and simpler circuit topology usually go hand in hand with fewer mass-production defects, increased reliability, reduced power consumption, faster performance, and reduced costs.

Ideally, each on-chip multiplier circuit should be of minimal size so that it can be squeezed economically into the limited space of an IC chip together with like and other functional circuits of the IC. Each on-chip multiplier circuit should also be very fast. It should complete its multiplication operations in minimal time. Moreover, each multiplier circuit should be relatively accurate; meaning that it can produce a correct, or approximately correct, result signal (C=A·B) even when given an n-bit wide multiplicand signal (A) and m-bit wide multiplier signal (B), where n and m are relatively large numbers.

Unfortunately, conventional approaches to multiplier design fail to attain ideal combinations of these characteristics without making substantial compromises. Multiplication speed and the number of bits handled can be increased through the use of conventional parallel design (e.g., a Wallace tree multiplier), but this tends to increase circuit size dramatically. Large circuit size is undesirable because it leads to decreased mass production yields, reduced per unit reliability, increased per-unit costs and higher levels of power consumption. Circuit size can be minimized through the use of a highly serial design, but then multiplication speed is disadvantageously reduced.

SUMMARY OF THE INVENTION

The invention overcomes the above-mentioned problems by providing an improved method and apparatus for digital multiplication based on sums and differences of finite sets of powers of two.

It is observed that the values 0 through 8 can be each expressed as a sum or difference of two terms, where each of the terms is set equal to a power of two or to zero.

Multiplication of an n-bits wide, multiplicand signal (A) by a multiplier signal (B) is realized in accordance with the invention by a multiples generating system comprised of: (a) a plurality of barrel shifting units for providing bit significance translation; (b) a summing unit operatively coupled to the barrel shifting units; and (c) a mapping control unit operatively coupled to the barrel shifting units and the summing unit for controlling the barrel shifting units and the summing unit. The multiplicand signal (A) is applied in parallel to the plural barrel shifting units. Each barrel shifting unit responds to a shift control signal (I,J) supplied to that shifting unit from the mapping control unit and outputs a corresponding term signal (T) representing either a zero or the multiplicand signal (A) shifted by a number of bits defined by the shift control signal (I,J). The map control unit responds to a supplied, m-bits wide, multiplier signal (B). Resulting term signals ($T_i$, $T_j$) are applied to the summing unit (adder/subtractor unit) for producing a result signal (C) representing sums and/or differences of the term signals. The mapping control unit determines whether the summing unit will perform an addition or a subtraction for each term signal. Appropriate mapping logic within the mapping control unit causes the result signal (C) to be a binary-coded signal representing a product of the multiplicand signal (A) and the multiplier signal (B).

BRIEF DESCRIPTION OF THE DRAWINGS

The below detailed description makes reference to the accompanying drawings, in which:

FIG. 6 is a block diagram of another n-by-m bit true multiplier system or, alternatively, an n-by-(m+1) bit pseudo multiplier system composed of plural graduator modules in accordance with the invention.

DETAILED DESCRIPTION

Figure 1:
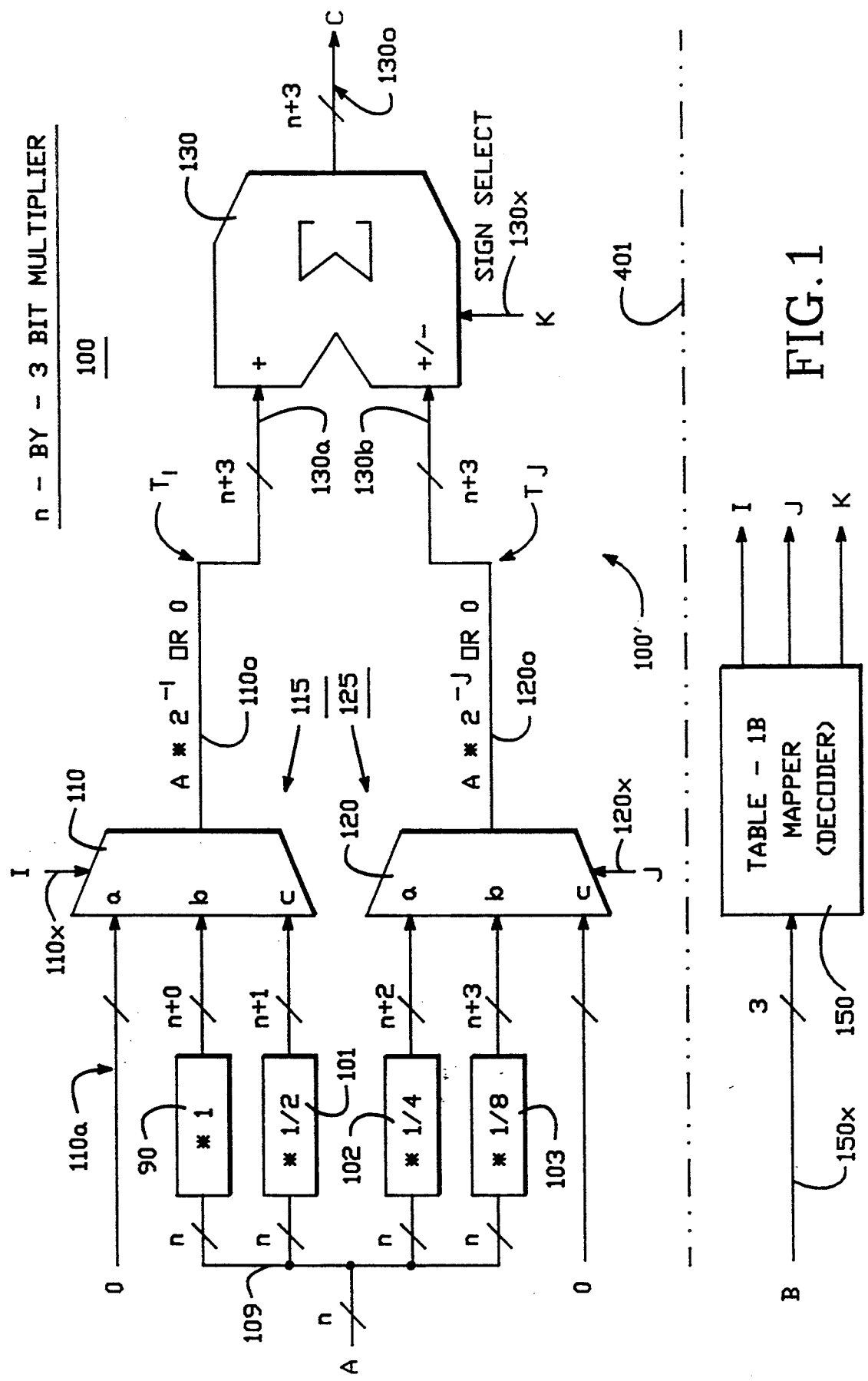
FIG. 1 is a schematic of an n-by-3 bit multiplier module (or "graduator" module) in accordance with the invention.

The invention takes advantage of a set of mathematical truths to provide a multiplier circuit (or a signal modulating circuit) that can be made smaller and/or faster and/or less expensive than conventional multiplier/modulator circuits.

The workings of the invention are perhaps best explained by first going through a set of mathematical exercises.

It is to be understood that although the exercises are initially mathematical in nature, each exercise has physical consequences when carried out by corresponding physical circuit elements; as will be explained in more detail below. The physical consequences include the establishment of physical circuit size, of physical circuit speed, physical power requirements and of physical interconnect requirements.

Consider first, a given multiplicand, A, that is to be multiplied by a multiplier value of B=2 to produce the result, C=A·B=A·2. The bullet symbol "·" is used here to denote pure mathematical multiplication.

In distinction, an asterisk "*" followed by a power of two, as in the notation "$A*2^i$", is generally used below to denote the physical act of shifting a representative binary-coded signal such as A by i bit positions to the left, if i is positive; or i bit positions to the right, if i is negative; to obtain a corresponding result signal representing multiplication by the stated power of two. Trailing bit positions are padded with zeroes. Leading bit positions are padded with zeroes or ones depending on the sign of the shifted signal A. (The latter operation is referred to as sign extension.)

The expression $A*2^{-i}$ therefore indicates that a representative signal, A, is physically shifted by i bits to the right to produce a result signal representative of the mathematical expression $A \cdot 2^{-i}$. (An exception to this usage is the expression $A*0$, which is used here to mean: replace the A signal with a zero result signal.)

The arrow symbol "→" is used below to indicate transition from the purely mathematical domain to the domain of physical implementation.

Given this, it is observed that the mathematical operation C=A·B=A·2 can be physically implemented in many ways, including but not limited to one or more of the following operations:

| Math side | | Physical implementation | |
|---|---|---|---|
| $A \cdot 2 = A \cdot (4 - 2)$ | | $\rightarrow A*2^2 - A*2^1$ | (Op1) |
| $A \cdot 2 = A \cdot (2 - 0)$ | | $\rightarrow A*2^1$ | (Op2) |
| $A \cdot 2 = A \cdot (1 + 1)$ | | $\rightarrow A*2^0 + A*2^0$ | (Op3) |
| $A \cdot 2 = A \cdot \left(1 + \frac{1}{2} + \frac{1}{4} + \frac{1}{8} + \frac{1}{16} + \frac{1}{32} + \ldots \right)$ | | $\rightarrow A*(2^0 + 2^{-1} + 2^{-2} + 2^{-3} + 2^{-4} \ldots)$ | (Op4) |

The physical implementation side (right side) of operation Op2 is the conventional approach. One simply shifts the multiplicand signal A left by one bit position, sets the resulting least significant bit to zero ("0"), and does nothing else. Such shifting can be carried out serially or in parallel. Parallel shifting can be implemented by hardwired routing of bus wires from a source register to a result register, and by hardwiring trailing bit positions to have zero values, thereby providing a very fast and economical solution.

The physical implementation sides of above operations Op1 and Op2 could be alternatively used, but they have the disadvantage of consuming more resources. Two shifters and a subtractor are used by Op1. Two shifters and an adder are used by Op3. It is worthy to note nonetheless, that a desired result for the computation, A·2, can be obtained as a sum or difference of signals provided by two shift operations.

The mathematical side of Op4 provides a precisely correct answer only when carried out to infinity. Thus it is not possible to carry out an exactly equivalent operation on the physical implementation side. It is worthy to note, however, that one can quantize the distance between a starting point (the number 1) and an end point (the number 2) to any level of finite precision by considering ever more negative powers of two. The precision of the result on the physical implementation side increases as one adds more stages and the result error decreases.

A more generic representation of Op4 is the following Op5:

$$A \cdot B = A \cdot \left(1 \pm \frac{1}{2} \pm \frac{1}{4} \pm \frac{1}{8} \pm \frac{1}{16} \pm \frac{1}{32} \pm \ldots \right) \rightarrow \quad \text{(Op5)}$$

$$A * (2^0 \pm 2^{-1} \pm 2^{-2} \pm 2^{-3} \pm 2^{-4} \ldots)$$

B can be any value in the range 0 to 2. With appropriate selection of a plus or minus for each "±" operation, one can converge on any value of B in the range 0 to 2. Certain values (rational values) can be precisely reached with a finite number of ± operations while others (irrational values) require an infinite number of such operations. Even for values that require an infinite number of ± operations, one can provide a usefully close approximation with a finite number of such operations. It is to be noted as an aside, that for certain applications, such as found in many DSP or neural network or "fuzzy logic" systems, a certain level of imprecision in the less significant bits of a result may be tolerable.

The above observations appear to have little relevance until coupled with the following.

Consider a number line extending from x=0 to x=1. Divide the line into eight equal segments, or "quantums". The division points fall at x=0, 0.125, 0.25, 0.375, 0.50, 0.675, 0.75, 0.875 and 1.00. The positional values of the segment end points can be expressed as fractions of the form P/Q, where Q=8, and P steps over the range of integers, 0 to 8. The same values can also be expressed in terms of sums or differences of integral powers of two as shown in the below Table-1A.

TABLE-1A

| Frac P/Q | Dec = | $T_i =$ Two to Pwr $-i$ or zero | Op = +/− | $T_j$ = Two to Pwr $-j$ or zero |
|---|---|---|---|---|
| 0/8 | 0.000 = | $2^{-3}$ | − | $2^{-3}$ |
| 1/8 | 0.125 = | -0- | + | $2^{-3}$ |
| 2/8 | 0.250 = | $2^{-1}$ | − | $2^{-2}$ |
| 3/8 | 0.375 = | $2^{-1}$ | − | $2^{-3}$ |
| 4/8 | 0.500 = | $2^{-1}$ | + | -0- |
| 5/8 | 0.625 = | $2^{-1}$ | + | $2^{-3}$ |
| 6/8 | 0.750 = | $2^{-0}$ | − | $2^{-2}$ |
| 7/8 | 0.875 = | $2^{-0}$ | − | $2^{-3}$ |
| 8/8 | 1.000 = | $2^{-0}$ | − | -0- |

The columns of Table-1A represent, in left to right order, the target value expressed as a fraction P/Q, the target value expressed as a decimal, an equal sign, a first term $T_i$ that is equal to either a first negative power of two ($2^{-i}$) or a zero value (−0−), an addition or subtraction operation (+ or −), and a second term $T_j$ that is equal to either a second negative power of two ($2^{-j}$) or a zero value (−0−). Table-1A therefore shows how each fraction P/Q, for P=0 to Q, can be formed of a sum or difference (+/−) of a first term $T_i$ and a second term signal $T_j$ where each term is equal to a negative power of two ($2^{-i}$ or $2^{-j}$) or a zero value (−0−).

Note that the values, 0.125, 0.25, 0.5 and 1.00 can be expressed in terms of a single integral-power of two (plus or minus a zero value), but the values 0.375, 0.625, 0.75, and 0.875 are expressed as differences or sums of integral-powers of two. In other words, to get to the value 0.750, one starts at the integral-power of two value, $2^{-1}$, and one steps up by another integral-power of two value, $2^{-2}$. To get to the value 0.875, one starts at an integral-power of two value such as, $2^{-0}$, and one steps down by another integral-power of two value, $2^{-3}$.

The combination of sums or differences of powers of two and the constant, zero, that are expressed above in Table-1A are not necessarily the only ways to reach the target values. The value P/Q=0.750 for example can be obtained by the summing operation $2^{-1}+2^{-2}$ instead of the illustrated difference operation, $2^{-0}-2^{-2}$. The value P/Q=0 can be obtained by adding zero plus zero or by subtracting any equal pair of values. Table-1A is merely illustrative of the concept. Values that are not themselves powers of two, can be constructed from sums and differences of powers of two. Preferably, one starts at a power of two that is closest to the target value, and then graduates up or down by a smaller value that is also a power of two in order to reach the target value. For all cases of P equals 0 to 8, the fraction P/8 can be constructed as a sum or difference of just two terms, $T_i$ and $T_j$, where each term is equal to a negative power of two ($2^{-i}$ or $2^{-j}$) or a zero value (−0−).

Table-1B (below) shows how a physical implementation can be constructed according to IF-THEN rules.

TABLE-1B

| If P = | Then: −Pwr i or zero | Then: Op +/− | Then: −Pwr j or zero |
|---|---|---|---|
| 0 | − | ? | − |
| 1 | − | + | 3 |
| 2 | 1 | − | 2 |
| 3 | 1 | − | 3 |
| 4 | 1 | ? | − |
| 5 | 1 | + | 3 |
| 6 | 0 | − | 2 |
| 7 | 0 | − | 3 |
| 8 | 0 | ? | − |

The columns of above Table-1B represent, in left-to-right IF/THEN order, the target value expressed by the numerator portion (If P=) of the fraction P/8, a consequential first negative power i for two ($2^{-i}$) or a consequential zero value (expressed as "- - -"), a corresponding addition or a subtraction or a don't care operation (+ or − or ?), and a consequential second negative power j for two ($2^{-j}$) or a zero value (- - -). Table-1B therefore shows how each fraction P/8, for P=0 to 8, can be constructed of a sum or difference (+/−) of two selected terms, where each term is picked with repetition allowed, from a group consisting of zero and the finite set of powers of two: $2^0$, $2^{-1}$, $2^{-2}$ and $2^{-3}$.

FIG. 1 shows an apparatus 100 that is structured in accordance with the invention for carrying out the IF/THEN operations specified in Table-1B to produce a desired result signal C=A·(P/8) for each integer value of P in the range 0 to 7, or 1 to 8; where P is mapped from a supplied multiplier signal, B.

Input signal A can have a word width of any number, n, of parallel bits. The width number, n is preferably equal to or greater than 4 to enable nibble-wide multiplication, and more preferably equal to an industry standardized data-word size such as 8-bits wide, 12-bits wide, 16-bits wide, 24-bits wide, 32-bits wide, 64-bits wide, and so forth.

Input signal B is preferably restricted to 3 bits and the corresponding eight binary bit patterns of B equals 000 through 111, are preferably mapped on a one-to-one linear basis to cover the cases of either P equal to zero through seven or P equal to one through eight. When this is so, apparatus 100 produces a result signal C representative of either C=A·(B/8) for each integer value of B in the range 0 to 7, or C=A·((B+1)/8) for each integer value of B in the range 0 to 7. In such a case, apparatus 100 is accordingly referred to as an n-by-3 bit multiplier module 100. If desired, B can be expanded to be 4 or 5 bits wide so that it can cover a wider range of values for P.

In the n-by-3 bit multiplier module 100 of FIG. 1, a first multiplexer 110 is provided having three input ports respectively denoted as 110a, 110b and 110c, each having an effective port width of n or more bits. First multiplexer 110 is further provided with a selection control port 110x for selecting one of the three input ports 110a, 110b and 110c. First multiplexer 110 is further provided with an output port 110o for outputting the signal applied to the selected one of the three input ports 110a, 110b and 110c. For reasons that will become apparent shortly, output port 110o is shown to have a bus width of n+3 bits.

A first 2 or 3-bits wide control signal, I, is applied to the selection control port 110x of first multiplexer 110 for selecting one of input ports 110a, 110b and 110c, as the input port whose signal will be output on multiplexer output port 110o.

Input port 110a receives a signal representing the value zero (0). This input port 110a can be thought of as being n-bits wide although it is just one wire carrying the same zero bit to many places. The effect of selecting a zero can be realized in some multiplexer designs by de-selecting both of the other input ports, 110b and 110c.

Input port 110b receives an n-bits wide signal representing the value of the multiplicand A times a first power of two. The illustrated case shows A times one (A*1 or A*$2^0$). In this particular case, the n-bits wide A signal is simply fed directly into input port 110a. A symbol 90 representing a times-one multiplier (*1, which could also be represented as *$2^0$) is shown interposed between the bus 109 that supplies the multiplicand A signal and input port 110b for illustrating a general relation with other power of two multipliers 101, 102 and 103 of FIG. 1.

Input port 110c receives an n+1 bits-wide signal representing the value of the multiplicand A times a second power of two ($2^{-1}$) which is one less than the first power of two ($2^0$) used at input port 110b. A symbol 101 representing a times one-half multiplier (*½, which could also be represented as *$2^{-1}$) is shown interposed between the multiplicand A signal supply bus 109 and input port 110b for carrying out this multiplication by a power of two.

It is understood that, for binary-coded representations of numerical values, multiplication of the multiplicand signal A by a power of two can be realized in FIG. 1 by a hardwired parallel shift with the more significant bits in the n-bits wide A signal being padded with zeroes in the case where A is positive. (A string of leading ones would be used in the case where A is negative.) The symbol "*$2^i$" is used in FIG. 1 to denote a shift operation performed to effect multiplication by the indicated power of two, i.

The combination of first multiplexer 110, shift units 90 and 101, and the zero value supplying input (110a) is referred to here as a first "or-zero" barrel shifter 115 because it functions either as a barrel shifter for outputting a signal representative of A shifted by one of a consecutive sequence of shift amounts (0, 1) or as a unit for outputting a signal representing the zero value.

In similar fashion, a second multiplexer 120 is provided having three input ports respectively denoted as 120a, 120b and 120c, each having an effective width of n or more bits, a selection control port 120x, and an output port 120o which is n+3 bits wide. A second control signal, J, is applied to selection control port 120x to select one of input ports 120a, 120b and 120c, as the input port whose signal will be output on multiplexer output port 120o.

Input port 120c receives a signal representing the value zero (0). Input port 120a receives an n+2 bits-wide signal representing the value of the multiplicand A times a third power of two ($2^{-2}$) which is one less than the second power of two ($2^{-1}$) used at input port 110c. A symbol 102 representing a times one-quarter multiplier (*¼, which could also be represented as *$2^{-2}$) is shown interposed between the multiplicand A signal supply bus 109 and input port 120a for carrying out multiplication by this power of two. Input port 120b receives an n+3 bits-wide signal representing the value of the multiplicand A times a fourth power of two ($2^{-3}$) which is one less than the third power of two ($2^{-2}$) used at input port 120a. A symbol 103 representing a times one-eighth multiplier (*⅛, which could also be represented as *$2^{-3}$) is shown interposed between the supplied multiplicand A signal and input port 120b for carrying out multiplication by this power of two.

The combination of second multiplexer 120, shift units 102 and 103, and the zero value supplying input (120c) defines a second "or-zero" barrel shifter 125 which functions either as a barrel shifter for outputting a signal representative of A shifted by one of a consecutive sequence of left shift amounts (2, 3) or as a unit for outputting a signal representing the zero value.

With appropriate settings of control signal I, the first "or-zero" barrel shifter 115 can be controlled to output a first term signal, $T_i$, that is n+3 bits-wide and represents one of the values: 0, A*$2^{-0}$ or A*$2^{-1}$. With appropriate settings of control signal J, the second "or-zero" barrel shifter 125 can be controlled to output a second term signal, $T_j$, that is n+3 bits-wide and represents one of the values: 0, A*$2^{-2}$ or A*$2^{-3}$.

The n-by-3 bit multiplier module 100 further includes an adder/subtractor unit 130 having first and second input ports 130a and 130b respectively coupled to receive the first and second term signals, $T_i$ and $T_j$, from the output ports 110o and 120o of the first and second multiplexers. Input port 130a receives the $T_i$ signal for summing $T_i$ into the result signal C that is produced by output port 130o of the adder/subtractor unit 130. Input port 130b receives the $T_j$ signal for either summing $T_j$ into or subtracting $T_j$ out of the result signal C. (C=$T_i$±$T_j$.) A sign-control signal, K is applied to a sign select control port 130x of the adder/subtractor unit 130 to determine whether the addition or subtraction of second term signal $T_j$ is performed. Output port 130o therefore produces a result signal C equal to (0, A*$2^{-0}$ or A*$2^{-1}$) plus or minus (0, A*$2^{-2}$ or A*$2^{-3}$). Output port 130o is either n+3 or n+4 bits-wide, depending on the range of values selected for P (0 through 7, or 1 through 8).

It is to be understood that even though the effective bit widths of n+1 through n+3 are shown for the signal carrying paths between the n bits-wide, multiplicand A signal supply bus 109 and the n+3 bits-wide, output port 130o, each such path does not necessarily have a full complement of n+x physical wires (x denotes here 1, 2 or 3). A physical wire is not required for a bit position that is always stuck at logic low ("0") or logic high ("1"). The effective bit widths of n+1 through n+3 are shown for the purpose of indicating the logical alignment of bits on parallel paths. For instance, there are only n+1 variable input bits at input port 130a of the adder/subtractor unit 130. These align with the most significant n+1 bits of the n+3 bits output at output port 130o. Similarly, there are only n+1 variable input bits at input port 130b of the adder/subtractor unit 130. These align with the less significant n+1 bits of the n+3 bits output at output port 130o.

Control signals I, J and K are produced by a mapping control unit 150 (a decoding unit) in response to a multiplier signal (B) supplied to a control input port 150x of unit 150. Mapping control unit 150 conceptually performs two successive mappings, first from B to P, and then from P to I, J and K. In practice, these two mappings can merge into one.

Mapping control unit 150 is preferably formed as a combinatorial logic circuit which has the 3-bits wide B multiplier signal as its input (150x) and control signals I, J and K as its outputs. The combinatorial logic of mapping control unit 150 performs its P to I, J, K mapping in accordance with above Table-1B or an equivalent. The combinatorial logic of mapping control unit 150 additionally performs a liner mapping of B to P and thereby drives the result signal C equal to the product A·B/8, where B can represent any one of eight sequential values selected from the series of integers zero to eight (0, 1, 2, ..., 8).

Actually, with some minor modifications to the circuit of FIG. 1; the 3-bit wide codes for B can be mapped over to any eight P values for P selected from the series of integers, minus ten to plus ten (−10, −9, ..., 0, 1, 2, ..., 10), as will be explained shortly. The number of values allowed for P is preferably limited to eight in order to limit the number of B input bits to 3 bits and thereby minimize circuit size and complexity.

If a larger number of values for P is desired, the control input port 150x of mapping control unit 150 can be expanded to 4 bits wide to permit a selection of as many as sixteen values for P in the range −10 to +10. If both negative and positive values of P are to be supported, an additional line should be added to output port 130o of the adder/subtractor unit for indicating polarity.

If even a larger number of values for P is desired, the control input port 150x of mapping control unit 150 can be expanded to 5 bits wide to permit a selection of any values for P in the range −10 to +10. The 5-bit wide implementation of control input port 150x is less preferred than the 3 or 4 bit implementations because it does not make optimum usage of all 5-bit wide patterns that could be applied into the control input port 150x of mapping control unit 150.

The eight or sixteen chosen values for P do not even have to be sequential. Any arbitrary set of values for P can be picked from the range −10 to +10. Given this, module 100 is more correctly defined as a signal "modulator", or a signal "scaler", or a signal "graduator" rather than merely as an n-by-3 bit multiplier because module 100 can be designed to output selected graduations, C=A·P/8, of the input A signal, for a predefined subset of P's selected by a supplied index signal (B) from the integer set −10 to +10; the graduations being in increments of A/8. Module 100 might be more properly referred to as a "sum/difference of two terms" graduator module since its main architectural limitation is the formation of the result signal C from a sum or difference of two term signals ($T_i$ and $T_j$) where each term signal represents either zero or A multiplied by a power of two. Arbitrary mappings of B to P may be used, if desired, to provide an encrypting function. But this is perhaps too premature a point in our discussion to raise these concepts.

The combinatorial logic circuitry of mapping control unit 150 can be designed to be of minimal size and/or maximum speed using well-known Karnough mapping techniques or the like. Alternatively, mapping control unit 150 can be formed from an appropriately programmed ROM, PROM, EEPROM, or other suitable random access memory means.

In yet another alternative embodiment, a sequence of settings for control signals I, J, K can be produced by a one or more sequential signal generators, and the value for B or P can be inferred by selecting a corresponding one of the generated settings for control signals I, J, K. There is no time delay for going from B to I, J, K because I, J, K are generated immediately and P or B are hypothetically inferred from the generated values of I, J, K. This inferential embodiment is particularly useful in applications where the settings for control signals I, J, K turn out to be periodic over time. An example is a case where the multiplicand A signal is to be used to modulate a carrier frequency signal (B) having a frequency that is a subharmonic of the data sample rate of the multiplicand A signal. (The sample rate of the A signal is equal to the carrier rate multiplied by an integer greater than one.) Calculations of the settings for control signals I, J, K do not necessarily need to be done in real-time at high speed. The sequence of settings for control signals I, J, K over a single period can be generated by a slow but compact-sized logic circuit; stored thereafter in a circulating shift register, and cycled through over and over again as carrier modulation later proceeds in real time.

The combinatorial logic implementation for mapping control unit 150 is generally preferred over a ROM or like mapper. The signal propagation time of the combinatorial logic implementation, from the B input port (150x) to the I, J, K output ports, is generally shorter, and the circuit size of the combinatorial logic implementation is generally smaller than that realized with the ROM approach. Note that for the inferential approach, there is no delay in going from B to I, J, K because the latter signals are generated directly, without translation from a supplied B or P value.

One advantage of the n-by-3 bit multiplier module 100 is that signal propagation delay from the multiplicand A input port to the result signal C output port is relatively small. The power of two shifting units 101, 102 and 103 (*½, *¼, *⅛) can be constructed as hardwired parallel bit shifts that have insignificant delay. First and second multiplexers, 110 and 120, can be constructed to also have relatively small signal propagation delays. Adder/subtractor unit 130 can be made to have a relatively short delay when designed, for example, according to a well known "carry look-ahead" approach. Alternatively, an equally well-known "carry-ripple" approach could be used. Although the carry-ripple design is slower than the carry look-ahead design, the carry-ripple design has the advantage of requiring less circuit space to implement. In cases where propagation time is not very critical, and small circuit size is more critical, the slower but smaller carry-ripple design is preferred over the faster but larger carry look-ahead design. General-purpose arithmetic logic units (ALU's) can also be used to implement the selectable add/subtract function. The choice of circuit design for implementing the selectable add/subtract function will be generally dictated by the overall goals of the circuit in which the n-by-3 multiplier module resides.

Equivalent gate counts or transistor counts are traditionally used as benchmarks for determining circuit size and/or circuit speed. (For the latter, one counts the number of gates connected in series in a critical path.) However, layout and interconnect routing often times play equally important roles in determining circuit size and/or circuit speed. One of the advantageous features of the n-by-3 bit multiplier module 100 (or "graduator" module 100) is that its physical components can be arranged on an integrated circuit in a layout topology that requires relatively little space for interconnect. This helps to reduce consumption of die area and to also reduce signal propagation delay due to excessive interconnect length.

Figure 2:
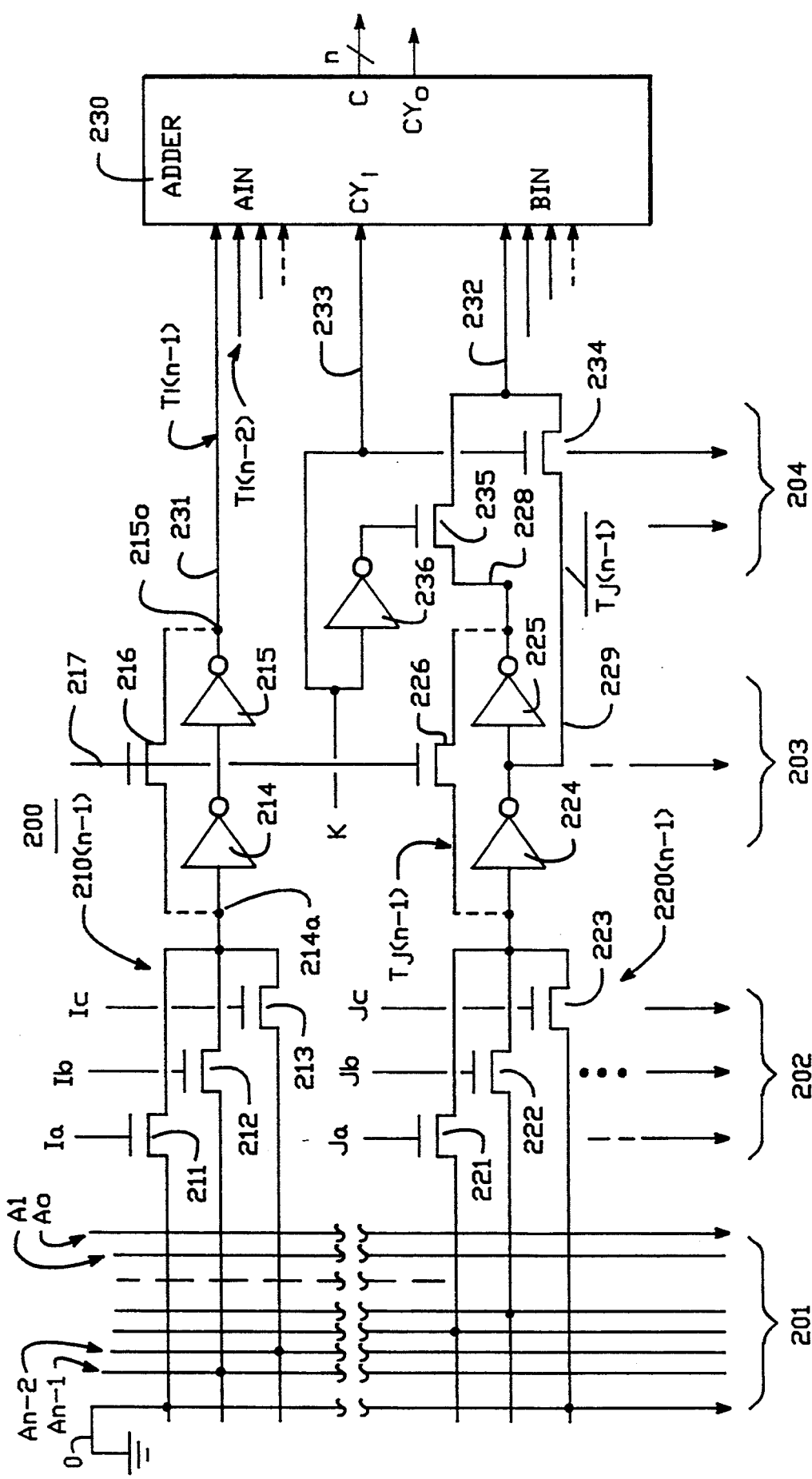
FIG. 2 is a detailed schematic showing a pass transistor implementation for the barrel shifters and adder/subtractor unit of FIG. 1.

FIG. 2 is a detailed schematic showing a pass-transistor implementation for the "or-zero" barrel shifters and adder/subtractor of FIG. 1 that requires relatively little space for interconnect. The topology of this pass-transistor implementation is referenced as 200.

A first vertical bus 201 extends through topology 200 for carrying the n bits of the multiplicand signal (A) in parallel. The individual lines of bus 201 are denoted as $A_0, A_1, A_2, \ldots, A_{n-2}, A_{n-1}$. First vertical bus 201 also carries the logic zero ("0") signal, which in this implementation is represented by ground. Bus 210 is therefore n+1 bits wide.

A first multiplexer cell 210(n−1) is formed of three N-channel MOS field effect transistors, 211, 212 and 213. Multiplexer control lines Ia, Ib and Ic run parallel to bus 201 and respectively connect to the gates of transistors, 211, 212 and 213. The source terminals of transistors, 211, 212 and 213 connect by way of horizontally running lines to selectable ones of the vertical lines ($A_0$–$A_{n-1}$ or 0) in bus 201. The drain terminals of transistors, 211, 212 and 213 are tied together and connect to an input node 214a of a signal amplifying inverter 214.

Logic highs ("1") are applied to the multiplexer control lines Ia, Ib or Ic on a mutually exclusive basis. Because first multiplexer cell 210(n−1) is used for defining the most significant bit ($T_{i(n-1)}$) of the first term signal, $T_i$, the source of pass transistor 212 is connected to the vertical bus wire carrying the most significant bit ($A_{n-1}$) of the n-bits wide multiplicand signal (A). Application of a logic high ("1") to multiplexer control line Ib turns pass transistor 212 on and thereby couples the most significant bit ($A_{n-1}$) of the multiplicand signal (A) to input node 214a. Inverters 214 and 215 are series coupled to amplify and transfer this signal as the most significant bit ($T_{i(n-1)}$) of first term signal $T_i$, thereby effecting part of an A*1 operation.

The source of pass transistor 213 is connected to the vertical bus wire carrying the second most significant bit ($A_{n-2}$) of the n-bits wide multiplicand signal (A). Application of a logic high ("1") to multiplexer control line Ic turns pass transistor 213 on and thereby couples the second most significant bit ($A_{n-2}$) of the multiplicand signal (A) to input node 214a. Inverters 214 and 215 couple this signal as the most significant bit ($T_{i(n-1)}$) of term signal $T_i$ thereby effecting part of an A*½ operation.

The source of pass transistor 211 is connected to the vertical bus wire carrying the zero signal (ground). Application of a logic high ("1") to multiplexer control line Ia turns pass transistor 211 on and thereby couples the zero signal level to input node 214a. Inverters 214 and 215 couple this signal as the most significant bit ($T_{i(n-1)}$) of term signal $T_i$ thereby effecting part of an A*0 operation.

If desired, a latch feedback transistor 216 is optionally provided in the circuit for selectively feeding back the output 215o of inverter 215 to the input node 214a of inverter 214, thereby forming a data storage latch for holding the logic low ("0") or logic high ("1") level output by first multiplexer cell 210(n−1). This data storage latch can be used for pipelined operation of the multiplier module. Vertical latch control line 217 runs parallel to bus 201 and connects to the gate of pass transistor 216 for controlling the turn-on and turn-off of that transistor 216.

The illustrated topology 200 also includes a carry-rippling adder 230 having an n-bits wide, A-input port (AIN); an n-bits wide, B-input port (BIN); a 1-bit wide carry input port (CYi) and an n-bits wide C-output port. Line 231 connects the output node 215o of inverter 215 to the most significant bit line (MSB) of the A-input port (AIN) of the carry-rippling adder 230.

Although not shown, it is to be understood that the circuitry of first multiplexer cell 210(n−1) and inverters 214, 215 is repeated a number of times, as one moves down first vertical bus 201 to thereby define the n-bits or wider ports of a multiplexer 210 corresponding to first multiplexer 110 of FIG. 1. Multiplexer control lines Ia, Ib and Ic continue down vertically as indicated by 202 to control the pass transistors of the remaining cells in multiplexer 210. Latch control line 217, when included, also continues downwardly as indicated by 203 to control the latch feedback transistors (216) of the remaining latches (214/215). The connections made from the source terminals of the pass transistors (211–213) in the remaining cells of multiplexer 210 to first vertical bus 201 will vary as understood by those skilled in the art to provide the A*0, A*1 and A*½ functions. The more significant bits of shifted right versions of the multiplicand signal (A) are padded with zeroes in the case where A is positive. If A is negative, the leading bits are padded with ones.

Those skilled in the art of integrated circuit fabrication will note that this topology 200 is very compact. The first vertical bus 201 can be formed in the first metal layer (metal-1) of an integrated circuit while multiplexer control lines Ia, Ib and Ic can be formed in an underlying first polysilicon layer (poly-1). Pass transistors 211–213 consume very little space in the substrate of the integrated circuit. The drain-to-drain connections between the transistors 211–213 can be made in the substrate. The source to bus 201 connections can be made by vias rising from the substrate to the metal-1 lines.

A second multiplexer 220, corresponding to multiplexer 120 of FIG. 1, is formed of cells such as 220(n−1) also shown in FIG. 2. Multiplexer cell 220(n−1) is composed of pass transistors 221–223 and configured similarly to the already-described first multiplexer cell 210(n−1). A different set of multiplexer control lines Ja, Jb and Jc connect to the gates of transistors 221–223 though. Control lines Ja, Jb and Jc run parallel to bus 201. The sources of pass transistors 221–223 connect to selectable ones of the wires ($A_0$ through $A_{n-1}$ and 0) in first vertical bus 201. The drain terminals of transistors, 221–223 are tied together and connect to an input node of inverter 224. Inverters 224 and 225 are series coupled to amplify and transfer either this signal ($T_{j(n-1)}$) or its one's complement to the most significant bit line 232 of the B-input port (BIN) of the carry-rippling adder 230 by way of a 1-of-2 multiplexer formed by N-channel transistors 234 and 235. If desired, a latch feedback transistor 226 can be provided for selectively feeding back the output of inverter 225 to the input of inverter 224, thereby forming a data storage latch for holding the logic low ("0") or logic high ("1") level output by second multiplexer cell 220(n−1). Vertical latch control line 217 connects to the gate of latch feedback transistor 226 for controlling the turn-on and turn-off of that transistor 226.

Transistor 234 selectively couples the output of inverter 224 to line 232. Transistor 235 selectively couples the output of inverter 225 to line 232. A sign defining signal, K, drives the gate of transistor 234. The complement of K is supplied to the gate of transistor 235 by way of inverter 236. Sign defining signal K also drives the carry-in input (CYi) of adder 230. When K is at logic high ("1"), a carry is introduced into adder 230 and the complement of signal ($T_{j(n-1)}$) passes to the most significant bit line 232 of the B-input port of adder 230. When K is at logic zero ("0"), no carry is introduced into adder 230 and the noncomplemented version of signal ($T_{j(n-1)}$) passes to the most significant bit line 232 of the B-input port of adder 230.

Although not shown, it is to be understood that the circuitry of second multiplexer cell 220(n−1), inverters 224, 225 and multiplexer 234/235 is repeated a number of times, as one moves down first vertical bus 201 to thereby define the n-bits or wider ports of a multiplexer 220 corresponding to second multiplexer 120 of FIG. 1 and the add/subtract selector of FIG. 1.

Multiplexer control lines Ja, Jb and Jc continue down vertically as indicated by 202 to control the pass transistors of the remaining cells in multiplexer 220. The K and K-complement lines continue down vertically as indicated by 204 to control the pass transistors (234/235) associated with the remaining cells. The connections made from the source terminals of the pass transistors (221–223) in the remaining cells of multiplexer 220 to first vertical bus 201 will vary as understood by those skilled in the art to provide the $A*0$, $A*\frac{1}{4}$ and $A*\frac{1}{8}$ functions. The more significant bits of shifted right versions of the multiplicand signal (A) are padded with zeroes in the case where A is positive. Leading ones are used in the case where A is negative.

It has already been hinted that, with some minor modifications, the n-by-3 bit multiplier module 100 or "graduator" module 100 of FIG. 1 can be used to drive the result signal C such that C defines a binary-coded value equal to the product $A·P/8$, where P can represent any one of eight values selected from the consecutive series of integers, minus ten to plus ten (−10, −9, −8, −7, ..., 0, 1, 2, ..., 10). The below Table-1C shows why. Note that the last row of Table-1C calls for a sum of three rather than two terms and that this last result of P=11 cannot be formed therefore as a sum or difference of just two terms, $T_i \pm T_j$. Note also that below Table-1C presupposes an ability to handle term signals $T_i$ and $T_j$ where either can be positive or negative. One of the modifications that may have to be made to the implementation 100 shown in FIG. 1 is incorporating a selectable plus-or-minus function for input 130a of the adder/subtractor unit 130 similar to that already provided at input 130b. Mapping control unit 150 would then need to be redesigned to control the plus/minus selection at such a modified input 130a.

TABLE-1C

| Target Value = | Sum of 2 Terms | Alternate Sum of 2 Terms | Sum of 3 Terms | Alternate Sum of 3 Terms |
|---|---|---|---|---|
| ... | | 0 − 4 | | |
| −3 | −1 − 2 | 1 − 4 | | |
| −2 | 0 − 2 | 2 − 4 | | |
| −1 | 0 − 1 | 1 − 2 | | |
| 0 | 0 ? 0 | ? − same? | | |
| 1 | 1 ? 0 | 2 − 1 | | |
| 2 | 2 ? 0 | 4 − 2 | | |
| 3 | 2 + 1 | 4 − 1 | | |
| 4 | 4 ? 0 | 8 − 4 | | |
| 5 | 4 + 1 | | | |
| 6 | 4 + 2 | 8 − 2 | | |
| 7 | 8 − 1 | | | |
| 8 | 8 ? 0 | 16 − 8 | | |
| 9 | 8 + 1 | | | |
| 10 | 8 + 2 | | | |
| 11 | | | 8 + 2 + 1 | 16 − 4 − 1 |

Any one of the values 0 through 10 can be expressed as a sum or difference of two terms where each term is a positive or negative integer equal to either an integral power of two or to zero. Of course, the power of two multiples ($A*2^{-i}$ and $A*2^{-j}$) output by each of multiplexers 110 and 120 may have to be varied to accommodate desired sets of values for $A·P/8$. As already noted, the value P=11 requires three such terms and therefore cannot be implemented simply with a two port adder/subtractor unit such as 130.

The negative range, P=−1 through −10, can be implemented in a number of ways. One can use the range, P=+1 through +10, and selectively perform a two's complement operation (not shown) at the C output 130o of FIG. 1. Alternatively, one can modify input port 130a of the adder/subtractor unit 130 to have a selectable plus-or-minus capability (not shown), as already suggested above. The latter approach may be useful in cases where both positive and negative values of P are desired. An asymmetrical modulator design, for example, might call for an output $C=A·(P/8)$ where P is selected from the range of eight values, −5 to +2. It is well within the purview of those skilled in the art to construct an ALU for such a purpose which selectively generates either the sum or difference of a plurality of supplied terms signals, $T_i$, $T_j$, etc., where each term signal can represent either a positive or negative multiple of a given multiplicand A signal.

If embodiment 100 (FIG. 1) is further modified by expanding the B input port 150x of mapping control unit 150 to four bits rather than the illustrated three bits, control unit 150 can be configured to drive result signal C to any one of 16 values representing $A·P/8$ in the range of integers P equals −10 to +10. If mapping control input port 150x is further expanded to five bits, control unit 150 can be configured to drive C to any one of as many as 21 values in the range of integers −10 to +10. Negative outputs will, of course, require an extra output line for the sign bit.

When mapping control unit 150 is configured to produce selected graduations, $C=A·P/8$, of the input A signal, for a predefined, sequential subset of P values selected from the consecutive integer set −10 to +10; the output signal C takes on the linear transfer form: $C=A·(B+F)/8$, where B is a supplied index signal and F is an offset constant. Mapping control unit 150 can also be configured to produce selected graduations, C=A·P/8, of the input A signal, for a predefined, NONconsecutive subset of P values selected from the consecutive integer set −10 to +10. In such a case, the output signal C can take on a NONlinear transfer function of the generalized form: C=A·f(B)/8, where B is a supplied index signal and f(B) is an arbitrarily chosen conversion function for mapping each input value of B to a predefined and corresponding value of P. Nonlinear transfer functions find use in fields such as telecommunications, where signals may require nonlinear emphasis and/or de-emphasis respectively before and after transmission through a telecommunications channel. Arbitrary transfer functions may also be used for encryption and decryption functions.

Figure 3:
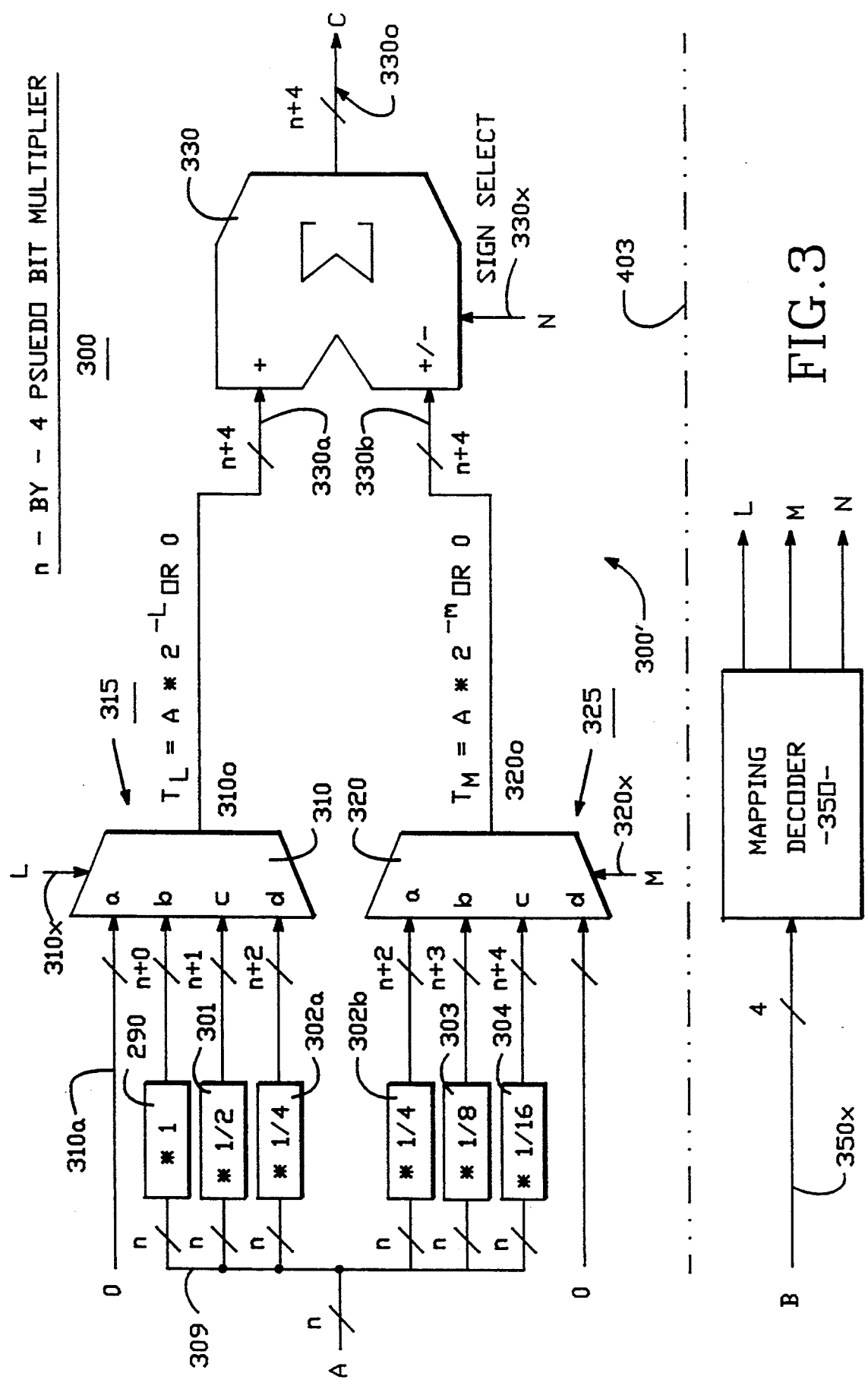
FIG. 3 is a schematic of an n-by-4 bit pseudo multiplier module (or "graduator" module) in accordance with the invention.

Referring to FIG. 3, suppose one wished to perform an n-by-4 bit multiplication, where a 4-bits wide multiplier signal (B) represents one of sixteen values in either the integer series 0 to 15, or the integer series 1 to 16. The n-by-4 bit pseudo multiplier module 300 shown in FIG. 3 could be used to "approximate" such a multiplication operation. (The reason for the qualifier "approximate" will be clarified shortly.)

Like reference symbols and numbers in the "300" series are used for elements of FIG. 3 which correspond to but are not necessarily the same as the elements represented by similar symbols and reference numbers of the "100" series in FIG. 1. As such, a detailed description of the elements found in FIG. 3 is omitted here.

In brief, multiplexer 310 has four input ports 310a–310d for selecting one of respective signals A*0, A*1, A*½, and A*¼ as the signal to be output from output port 310o in response to a control signal L applied to control port 310x. Multiplexer 320 similarly has four input ports 320a–320d for selecting one of respective signals A*¼, A*⅛, A*1/16, and A*0 as the signal to be output from output port 320o in response to a control signal M applied to control port 320x. Shift units 301, 302a, 302b, 303 and 304 are interposed between the n bits-wide bus 309 carrying the multiplicand A signal the corresponding buses of effective bit-widths, n+1, n+2, n+2, n+3, n+4, that carry respective signals A*½, A*¼, A*¼, A*⅛, and A*1/16. The combination of first multiplexer 310, and its shift units 290, 301 and 302a, and the zero value supplying input (310a) defines a first "or-zero" barrel shifter 315. The combination of second multiplexer 320, and its shift units 302b, 303 and 304, and the zero value supplying input (320d) defines a second "or-zero" barrel shifter 325. First and second term signals, $T_L$ and $T_M$, are supplied to respective, n+4 bits-wide input ports 330a and 330b of adder/subtractor unit 330 for producing, in response to a sign select signal N that is applied to control port 330x, a result signal C representing either the sum or difference between the first and second term signals, $T_L$ and $T_M$. Result signal C can be n+4 or n+5 bits-wide depending on the values that may be presented at the inputs 330a and 330b of adder/subtractor unit 330. (Note that the term value T=A*4/16 can be output from each of multiplexers 310 and 320. The term value T=A*0/16 can also be output from each of multiplexers 310 and 320.)

Comments made with regard to the effective bit widths of FIG. 1 apply equally to the effective bit widths shown in FIG. 3. Although input port 330a is shown to have an effective width of n+4 bits, there are only n+2 variable input bits at input port 330a of the adder/subtractor unit 330. These align with the most significant n+2 bits of the n+4 bits output at output port 330o. Similarly, there are only n+2 variable input bits at input port 330b of the adder/subtractor unit 330. These align with the less significant n+2 bits of the n+4 bits output at output port 330o.

Mapping control unit 350 receives a 4-bits wide, multiplier signal (B) on control input port 350x and converts it to appropriate control signals L, M and N so that result signal C represents the product A·(P/16) for all values of P between 0 and 15 (or 1 and 16) except the values P=11 and P=13. In one embodiment of the n-by-4 bit pseudo multiplier module 300, an input of B=P=11 produces the approximating result C=A*10/16 and an input of B=P=13 produces the approximating result C=A*12/16. It is to be understood that the topology 200 shown in FIG. 2 can be applied to FIG. 3 in a fashion similar to that applied to FIG. 1.

The descriptors "approximate" or "pseudo" multiplication were used above in the description of the n-by-4 bit module 300 to indicate that module 300 does not accurately replicate all the results of the A times B/16 multiplication table. To be precise, the results for A·11/16 and A·13/16 require a sum or difference of three terms (each a power of two) rather than two terms. This is shown in below Table-2.

TABLE-2

| Target Value = | Sum of 2 Terms | Alternate Sum of 2 Terms | Sum of 3 Terms | Alternate Sum of 3 Terms |
|---|---|---|---|---|
| 0 | 0 ? 0 | ? — same? | | |
| 1 | 0 + 1 | 2 − 1 | | |
| 2 | 0 + 2 | 4 − 2 | | |
| 3 | 4 − 1 | 2 + 1 | | |
| 4 | 4 ? 0 | 8 − 4 | | |
| 5 | 4 + 1 | | | |
| 6 | 4 + 2 | 8 − 2 | | |
| 7 | 8 − 1 | | | |
| 8 | 8 ? 0 | 16 − 8 | | |
| 9 | 8 + 1 | | | |
| 10 | 8 + 2 | | | |
| 11 | | | 8 + 2 + 1 | 16 − 4 − 1 |
| 12 | 8 + 4 | 16 − 4 | | |
| 13 | | | 8 + 4 + 1 | 16 − 4 + 1 |
| 14 | 16 − 2 | | | |
| 15 | 16 − 1 | | | |
| 16 | 16 + 0 | | | |

It should be apparent that all values shown in Table-2 are in terms of sixteenths. The operation for realizing a target multiplication of A*12/16 can be implemented by A*(8/16+4/16) or by A*(16/16−4/16) as indicated in the row having a "target value" of 12. Although values such as 7/16 can be formed of three terms, (4+2+1)/16, the expressions which use only the sum or difference of two terms are shown while the expressions which rely on a sum or difference of more than two terms are hidden when possible. Note that the third from left column (Sum of 2 Terms) of Table-2 is arranged such that smaller adjustments of ±0, ±1, ±2 and ±4 are on the right side of the two-term expression $T_L \pm T_M$ while generally larger, starting values of 16, 8 and 4 (and 0) are on the left side of the two-term expression $T_L \pm T_M$. The $T_L$ and $T_M$ outputs of respective multiplexers 310 and 320 follow this strategy.

Two power of two terms can not be used alone to form the target multipliers, 11/16 and 13/16. One solution would be to do a summation or difference of three terms. If this were to be done, the 8+2+1 and 8+4+1 options are preferred over the 16−4−1 and 16−4+1 options because the former options do not require sign selection for the third term. The +1 portion of summations 8+2+1 and 8+4+1 would require an additional multiplexer (not shown) for selectively outputting A*1/16 or A*0 and an additional input port (not shown) on the adder/subtractor unit 330 for adding the output of the additional multiplexer (not shown) into the result signal C. The mapping control unit 350 would have to have a further control output (not shown) to support this additional multiplexer (not shown). The problem with such a solution, however, is that the size and complexity of the overall circuit would have to grow to support this additional capability.

Another solution is to simply accept a certain degree of imprecision in the output of the n-by-4 bit pseudo multiplier module 300. This can be done in applications which can tolerate some degree of imprecision in the less significant bits. If one were to use the output for A·10/16, for example, as an approximating substitute for A·11/16, the error would be −A/16. If one were to further use the output for A·12/16 as an approximating substitute for A·13/16, the error would also be −A/16. The output is correct for all other values of B=P in the range P equals 0 to 15.

Note that the sign of the error can be varied to +A/16 for either or both cases of B=11 and B=13 by using the other adjacent results of B=12 as a substitute approximation for B=11 and using B=14 as a substitute approximation for B=13. The amount and polarity of error is determined by the mapping performed in mapping unit 350. Certain DSP applications, particularly those where the multiplication result signal C is averaged over time, can tolerate a small error that fluctuates uniformly from positive to negative. This balanced fluctuation tends to produced a statistically self-canceling error.

Like module 100, the module 300 shown in FIG. 3 can be modified to produce a more generalized set of selected graduations, C=A·P/16, of the input A signal, for a predefined subset of P values selected from a suitable integer set (e.g., −21 to +21). See the below Table-3 and note that values P=11, 13 (from Table-2), 91, 21, 23, 25, 27 and 29 can be approximated with an error of one part per 16. The output signal C can approximate the linear transfer form: C=A·(B+F)/16, where B is a supplied index signal and F is an offset constant, or the NONlinear transfer form: C=A·f(B)/16, where f(B) is a conversion function for converting each input value of the index signal B to a predefined and corresponding value of P.

Suppose one wished to perform an n-by-5 bit multiplication. The two and three-term options shown by below Table-3 in combination with above Table-2 could be used. But this presents the disadvantageous result of larger circuit size and complex control as already mentioned in regard to the n-by-4 bit pseudo multiplier module 300.

TABLE-3

| Target Value = | Sum of 2 Terms | Sum of 2 Terms | Sum of 3 Terms | Sum of 3 Terms |
|---|---|---|---|---|
| 17 | 16 + 1 | | | |
| 18 | 16 + 2 | | | |
| 19 | | | 16 + 2 + 1 | |
| 20 | 16 + 4 | 16 − 4 | | |
| 21 | | | 16 + 4 + 1 | |
| 22 | | | 16 + 4 + 2 | 16 + 8 − 2 |
| 23 | | | 16 + 8 − 1 | 32 − 8 − 1 |

TABLE-3-continued

| Target Value = | Sum of 2 Terms | Sum of 2 Terms | Sum of 3 Terms | Sum of 3 Terms |
|---|---|---|---|---|
| 24 | 16 + 8 | 32 − 8 | | |
| 25 | | | 16 + 8 + 1 | 32 − 8 + 1 |
| 26 | | | 16 + 8 + 2 | 32 − 4 − 2 |
| 27 | | | | 32 − 4 − 1 |
| 28 | 32 − 4 | | | |
| 29 | | | | 32 − 4 + 1 |
| 30 | 32 − 2 | | | |
| 31 | 32 − 1 | | | |
| 32 | 32 + 0 | | | |

Figure 4A:
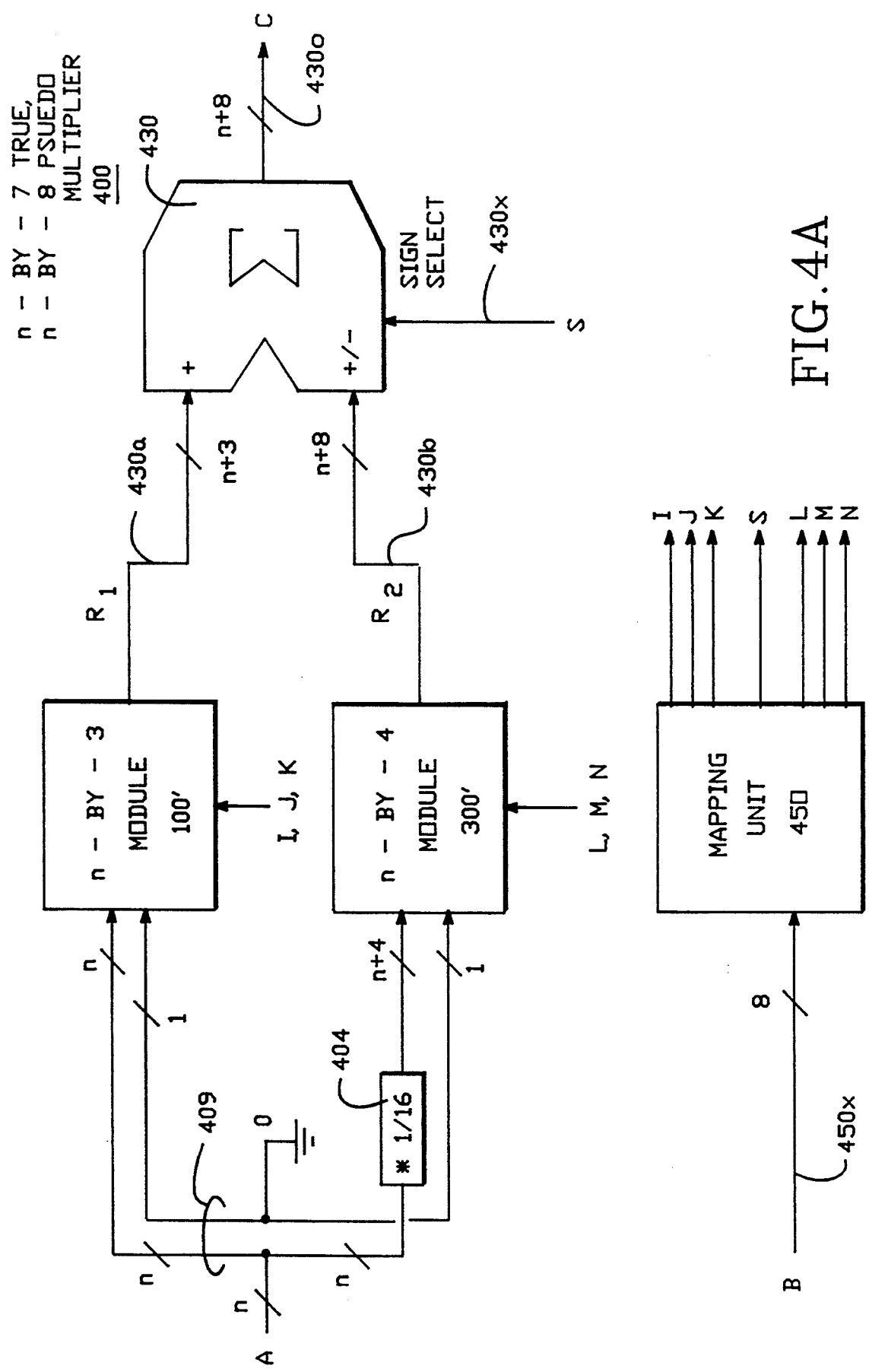
FIG. 4 is a block diagram of an n-by-7 bit true multiplier module or, alternatively, an n-by-8 bit pseudo multiplier module in accordance with the invention.
FIG. 4B is a plot showing the gain and error of the n-by-8 bit pseudo multiplier module of FIG. 4A for values of B equal to 0 through 255.

FIG. 4A shows an alternative approach. The n-by-3 bit module of FIG. 1 is combined with the n-by-4 bit pseudo multiplier module of FIG. 3 to provide an n-by-7 bit true multiplier module 400 which can also function as an n-by-8 bit pseudo multiplier.

The n-by-3 bit module (100′) generates, without error, "coarse" multiples of input signal A in graduations of A divided by eight as defined by: A·P/8 for P=0 to 7 or P=1 to 8. The n-by-4 bit module (300′) generates "finer adjusting" multiples of input signal A in graduations of A divided by two hundred fifty six, as defined by: A·P′/256 for P′=0 to 15 or P′=1 to 16 (but with approximation errors at P′=11 and P′=13).

The A·P′/256 fine graduations are added to or subtracted from the A·P/8 coarse graduations in order to provide a full spectrum of values A·P″/128 for the range, P″=0 to 128, thereby defining a true (i.e., numerically precise) 7-bit by n-bit multiplier. Alternatively, the A·P′/256 fine graduations are added to or subtracted from the A·P/8 coarse graduations in order to provide an almost full spectrum of values A·P‴/256 for the range, P‴=0 to 256. (A·P‴/256=A·P/8±A·P′/256.) The latter defines the n-by-8 bit pseudo multiplier which has a small error of plus or minus one least significant multiplicand bit at the following thirty-two points: P‴=11, 13, 19, 21, 43, 45, 51, 53, 75, 77, 83, 85, 107, 109, 115, 117, 139, 141, 147, 149, 171, 173, 179, 181, 203, 205, 211, 213, 235, 237, 243 and 245.

In FIG. 4A, an n-bits wide, multiplicand signal (A) is supplied in parallel into the n-by-⅞ multiplier module 400 over an (n+1)-bits wide vertical bus 409. (Read the notation "n-by-⅞" as n-by-true7 or n-by-pseudo8.) The extra bit of bus 409 is the zero value bit (ground line). A 7 or 8-bits wide, multiplier signal (B) is introduced into the n-by-⅞ multiplier module 400 over an 8-bits wide control bus 450x. In the case where B is less than 8-bits wide, the less significant bits (LSB's) of control bus 450x are set to the zero value (grounded) or alternatively, the superfluous logic within mapping unit 450 which relies on such LSB's is eliminated.

The n-by-3 module 100′ of FIG. 4A represents the upper part of FIG. 1, above section line 401. The n-by-4 module 300′ represents the upper part of FIG. 3, above section line 403.

$R_1$ represents a first partial result signal output by the n-by-3 module 100′. This first partial result signal $R_1$ is n+3 bits-wide. As in FIG. 1, control signals I, J, K are applied to the n-by-3 module 100′ so that the first partial result signal $R_1$ will represent gradations of input signal A divided by 8. $R_1$=A·P/8 for P equal to 0 through 7 (or alternatively, 1 through 8).

A *1/16 prescaler symbol 404 is drawn before the n-by-4 module 300′ of FIG. 4A to indicate that, unlike FIG. 3, the n-by-4 module 300′ outputs a second partial result signal $R_2$ representative of gradations of A divided by 256. ($R_2 = A \cdot P'/256$ for P' in the range 0 through 15 or alternatively, 1 through 16 with approximations at P'=11 and P'=13.) The second partial result signal $R_2$ is n+8 bits-wide. Control signals L, M, N are applied to the n-by-4 module 300' for producing desired values of second partial result signal $R_2$ in the range A·0/256 to A·15/256 (or A·1/256 to A·16/256).

It is to be understood that the *1/16 prescaling operation of symbol 404 is preferably combined with the *1 through *1/16 operations shown in FIG. 3, so that, rather than performing the *1/16 operation of symbol 404 first and following it with subsequent *1 through *1/16 operations within module 300', hardwired connections are made between bus 409 and the multiplexers 310 and 320 of n-by-4 module 300' for effecting, in one step, the resultant shift operations of: A*1/16 (supplied to input port 310b of FIG. 3), A*1/32 (supplied to input port 310c), A*1/64 (supplied to 310d), A*1/64 (supplied to 320a), A*1/128 (supplied to 320b), and A*1/256 (supplied to 320c). The symbol 404 is shown outside of module 300' in FIG. 4A to emphasize that the finest (nonzero) gradation of A that can be represented by second partial result signal $R_2$ is one sixteenth the finest (nonzero) gradation of A that can be represented by first partial result signal $R_1$.

First and second partial result signals, $R_1$ (n+3 effective bits-wide) and $R_2$ (n+8 effective bits-wide), are supplied to respective input ports 430a and 430b of adder/subtractor unit 430 for producing, in response to a sign select signal S that is applied to control port 430x of unit 430, a result signal C representing either the sum or difference between the first and second partial result signals, $R_1$ and $R_2$, at output port 430o. Result signal C is n+8 or fewer bits-wide depending on the degree of precision and accuracy desired. Adder/subtractor unit 430 is preferably made from a carry-rippling adder so that it will be compact in size. A faster but larger, carry look-ahead design can, of course, be used as an alternative in implementing the adder/subtractor unit 430.

Comments made with regard to the effective bit widths of FIGS. 1 and 3 apply equally to the effective bit widths shown in FIG. 4A. Although input port 430b is shown to have an effective width of n+8 bits, there are only n+4 variable input bits at input port 430b of the adder/subtractor unit 430. These align with the less significant n+4 bits of the $n+\frac{7}{8}$ bits output at output port 430o. The n+3 variable input bits at input port 430a of the adder/subtractor unit 430 align with the more significant n+3 bits of the $n+\frac{7}{8}$ bits output at output port 430o.

A mapping control unit 450 is further provided in the n-by-$\frac{7}{8}$ multiplier module 400 as shown. The mapping control unit 450 receives the 7 or 8-bits wide, multiplier signal (B) maps B to P and P', and converts the P and P' values (coarse approximation and fine adjustment values) to appropriate control signals I, J, K, L, M, N and S so that result signal C represents the product A·(B/128) for B representing values between 0 and 128 (the LSB of an 8-bit B signal is held at 0); or so that result signal C represents the product A·(B/256) for B representing almost all values between 0 and 256; the exception occurring as mentioned before for values that require a sum of three terms in n-by-4 module 300' rather than a sum of just two terms.

Mapping control unit 450 is preferably formed as a combinatorial logic circuit which has the 8-bits wide bus 450x as its input and control signals I, J, K, L, M, N and S as its outputs. Mapping control unit 450 operates in accordance with principles set forth in the above Table-1B and Table-2 or equivalents of these tables. Preferably, one starts at a "coarsely-granulated" $R_1$ value that is closest to a desired target value, and then graduates up or down by a smaller and more "finely-granulated" $R_2$ value in order to reach the desired target value. The combinatorial logic circuitry of mapping control unit 450 can be designed using well-known Karnough mapping techniques or the like. Alternatively, mapping control unit 450 can be formed from an appropriately programmed ROM, PROM, EEPROM, or other suitable random access memory means. The signal propagation time of the combinatorial logic implementation, from the B input port 450x to the I, J, K, L, M, N and S output ports, is generally shorter though, and the circuit size of the combinatorial logic implementation is generally smaller. Thus the combinatorial logic implementation is usually preferred.

The below Table-4 shows a representative mapping function where P is an 8-bits wide binary-coded signal applied to control bus 450x and I, J, K, L, M, N and S are the correspondingly output control signals. The notations in Table-4 for I, J, L and M define the selected negative power i in the expression "A*2$^{-i}$" if given as a number, or selection of A*0 if given as a triple dash "- -". The values in Table-4 for sign selection signals K, N and S indicate addition if equal to zero ("0") and subtraction if equal to one ("1"). The symbol "x" indicates a don't care.

TABLE-4

| Index P 0:256 | Module 100' | | | Module 300' | | | Module 430 |
|---|---|---|---|---|---|---|---|
| | I 0:1 | J 2:3 | K | L 4:6 | M 6:8 | N | S |
| 0 | — | — | x | — | — | x | 0 |
| 1 | — | — | x | — | 8 | 0 | 0 |
| 2 | — | — | x | — | 7 | 0 | 0 |
| 3 | — | — | x | 6 | 8 | 1 | 0 |
| 4 | — | — | x | 6 | — | x | 0 |
| 5 | — | — | x | 6 | 8 | 0 | 0 |
| 6 | — | — | x | 5 | 7 | 1 | 0 |
| 7 | — | — | x | 5 | 8 | 1 | 0 |
| 8 | — | — | x | 5 | — | x | 0 |
| 9 | — | — | x | 5 | 8 | 0 | 0 |
| 10 | — | — | x | 5 | 7 | 0 | 0 |
| 11 | — | — | x | 5 | 7 | 0 | 0 |
| 12 | — | — | x | 5 | 6 | 0 | 0 |
| 13 | — | — | x | 5 | 6 | 0 | 0 |
| 14 | — | — | x | 4 | 7 | 1 | 0 |
| 15 | — | — | x | 4 | 8 | 1 | 0 |
| 16 | — | 3 | 0 | 4 | — | x | 1 |
| 17 | — | 3 | 0 | 4 | 8 | 1 | 1 |
| 18 | — | 3 | 0 | 4 | 7 | 1 | 1 |
| 19 | — | 3 | 0 | 5 | 6 | 0 | 1 |
| 20 | — | 3 | 0 | 5 | 6 | 0 | 1 |
| 21 | — | 3 | 0 | 5 | 7 | 0 | 1 |
| 22 | — | 3 | 0 | 5 | 7 | 0 | 1 |
| 23 | — | 3 | 0 | 5 | 8 | 0 | 1 |
| 24 | — | 3 | 0 | 5 | — | x | 1 |
| 25 | — | 3 | 0 | 5 | 8 | 1 | 1 |
| 26 | — | 3 | 0 | 5 | 7 | 1 | 1 |
| 27 | — | 3 | 0 | 6 | 8 | 0 | 1 |
| 28 | — | 3 | 0 | 6 | — | x | 1 |
| 29 | — | 3 | 0 | 6 | 8 | 1 | 1 |
| 30 | — | 3 | 0 | — | 7 | 0 | 1 |
| 31 | — | 3 | 0 | — | 8 | 0 | 1 |
| 32 | — | 3 | 0 | — | — | x | 0 |
| 33 | — | 3 | 0 | — | 8 | 0 | 0 |
| 34 | — | 3 | 0 | — | 7 | 0 | 0 |
| 35 | — | 3 | 0 | 6 | 8 | 1 | 0 |
| 36 | — | 3 | 0 | 6 | — | x | 0 |
| 37 | — | 3 | 0 | 6 | 8 | 0 | 0 |
| 38 | — | 3 | 0 | 5 | 7 | 1 | 0 |
| 39 | — | 3 | 0 | 5 | 8 | 1 | 0 |
| 40 | — | 3 | 0 | 5 | — | x | 0 |
| 41 | — | 3 | 0 | 5 | 8 | 0 | 0 |

TABLE-4-continued

| Index P 0:256 | Module 100' I 0:1 | J 2:3 | K | Module 300' L 4:6 | M 6:8 | N | Module 430 S |
|---|---|---|---|---|---|---|---|
| 42 | — | 3 | 0 | 5 | 7 | 0 | 0 |
| 43 | — | 3 | 0 | 5 | 7 | 0 | 0 |
| 44 | — | 3 | 0 | 5 | 6 | 0 | 0 |
| 45 | — | 3 | 0 | 5 | 6 | 0 | 0 |
| 46 | — | 3 | 0 | 4 | 7 | 1 | 0 |
| 47 | — | 3 | 0 | 4 | 8 | 1 | 0 |
| 48 | 1 | 2 | 1 | 4 | — | x | 1 |
| 49 | 1 | 2 | 1 | 4 | 8 | 1 | 1 |
| 50 | 1 | 2 | 1 | 4 | 7 | 1 | 1 |
| 51 | 1 | 2 | 1 | 5 | 6 | 0 | 1 |
| 52 | 1 | 2 | 1 | 5 | 6 | 0 | 1 |
| 53 | 1 | 2 | 1 | 5 | 7 | 0 | 1 |
| 54 | 1 | 2 | 1 | 5 | 7 | 0 | 1 |
| 55 | 1 | 2 | 1 | 5 | 8 | 0 | 1 |
| 56 | 1 | 2 | 1 | 5 | — | x | 1 |
| 57 | 1 | 2 | 1 | 5 | 8 | 1 | 1 |
| 58 | 1 | 2 | 1 | 5 | 7 | 1 | 1 |
| 59 | 1 | 2 | 1 | 6 | 8 | 0 | i |
| 60 | 1 | 2 | 1 | 6 | — | x | 1 |
| 61 | 1 | 2 | 1 | 6 | 8 | 1 | 1 |
| 62 | 1 | 2 | 1 | — | 7 | 0 | 1 |
| 63 | 1 | 2 | 1 | — | 8 | 0 | 1 |
| 64 | 1 | 2 | 1 | — | — | x | 0 |
| 65 | 1 | 2 | 1 | — | 8 | 0 | 0 |
| 66 | 1 | 2 | 1 | — | 7 | 0 | 0 |
| 67 | 1 | 2 | 1 | 6 | 8 | 1 | 0 |
| 68 | 1 | 2 | 1 | 6 | — | x | 0 |
| 69 | 1 | 2 | 1 | 6 | 8 | 0 | 0 |
| 70 | 1 | 2 | 1 | 5 | 7 | 1 | 0 |
| 71 | 1 | 2 | 1 | 5 | 8 | 1 | 0 |
| 72 | 1 | 2 | 1 | 5 | — | x | 0 |
| 73 | 1 | 2 | 1 | 5 | 8 | 0 | 0 |
| 74 | 1 | 2 | 1 | 5 | 7 | 0 | 0 |
| 75 | 1 | 2 | 1 | 5 | 7 | 0 | 0 |
| 76 | 1 | 2 | 1 | 5 | 6 | 0 | 0 |
| 77 | 1 | 2 | 1 | 5 | 6 | 0 | 0 |
| 78 | 1 | 2 | 1 | 4 | 7 | 1 | 0 |
| 79 | 1 | 2 | 1 | 4 | 8 | 1 | 0 |
| 80 | 1 | 3 | 1 | 4 | — | x | 1 |
| 81 | 1 | 3 | 1 | 4 | 8 | 1 | 1 |
| 82 | 1 | 3 | 1 | 4 | 7 | 1 | 1 |
| 83 | 1 | 3 | 1 | 5 | 6 | 0 | 1 |
| 84 | 1 | 3 | 1 | 5 | 6 | 0 | 1 |
| 85 | 1 | 3 | 1 | 5 | 7 | 0 | 1 |
| 86 | 1 | 3 | 1 | 5 | 7 | 0 | 1 |
| 87 | 1 | 3 | 1 | 5 | 8 | 0 | 1 |
| 88 | 1 | 3 | 1 | 5 | — | x | 1 |
| 89 | 1 | 3 | 1 | 5 | 8 | 1 | 1 |
| 90 | 1 | 3 | 1 | 5 | 7 | 1 | 1 |
| 91 | 1 | 3 | 1 | 6 | 8 | 0 | 1 |
| 92 | 1 | 3 | 1 | 6 | — | x | 1 |
| 93 | 1 | 3 | 1 | 6 | 8 | 1 | 1 |
| 94 | 1 | 3 | 1 | — | 7 | 0 | 1 |
| 95 | 1 | 3 | 1 | — | 8 | 0 | 1 |
| 96 | 1 | 3 | 1 | — | — | x | 0 |
| 97 | 1 | 3 | 1 | — | 8 | 0 | 0 |
| 98 | 1 | 3 | 1 | — | 7 | 0 | 0 |
| 99 | 1 | 3 | 1 | 6 | 8 | 1 | 0 |
| 100 | 1 | 3 | 1 | 6 | — | x | 0 |
| 101 | 1 | 3 | 1 | 6 | 8 | 0 | 0 |
| 102 | 1 | 3 | 1 | 5 | 7 | 1 | 0 |
| 103 | 1 | 3 | 1 | 5 | 8 | 1 | 0 |
| 104 | 1 | 3 | 1 | 5 | — | x | 0 |
| 105 | 1 | 3 | 1 | 5 | 8 | 0 | 0 |
| 106 | 1 | 3 | 1 | 5 | 7 | 0 | 0 |
| 107 | 1 | 3 | 1 | 5 | 7 | 0 | 0 |
| 108 | 1 | 3 | 1 | 5 | 6 | 0 | 0 |
| 109 | 1 | 3 | 1 | 5 | 6 | 0 | 0 |
| 110 | 1 | 3 | 1 | 4 | 7 | 1 | 0 |
| 111 | 1 | 3 | 1 | 4 | 8 | 1 | 0 |
| 112 | 1 | — | x | 4 | — | x | 1 |
| 113 | 1 | — | x | 4 | 8 | 1 | 1 |
| 114 | 1 | — | x | 4 | 7 | 1 | 1 |
| 115 | 1 | — | x | 5 | 6 | 0 | 1 |
| 116 | 1 | — | x | 5 | 6 | 0 | 1 |
| 117 | 1 | — | x | 5 | 7 | 0 | 1 |
| 118 | 1 | — | x | 5 | 7 | 0 | 1 |
| 119 | 1 | — | x | 5 | 8 | 0 | 1 |
| 120 | 1 | — | x | 5 | — | x | 1 |
| 121 | 1 | — | x | 5 | 8 | 1 | 1 |
| 122 | 1 | — | x | 5 | 7 | 1 | 1 |
| 123 | 1 | — | x | 6 | 8 | 0 | 1 |
| 124 | 1 | — | x | 6 | — | x | 1 |
| 125 | 1 | — | x | 6 | 8 | 1 | 1 |
| 126 | 1 | — | x | — | 7 | 0 | 1 |
| 127 | 1 | — | x | — | 8 | 0 | 1 |
| 128 | 1 | — | x | — | — | x | 0 |
| 129 | 1 | — | x | — | 8 | 0 | 0 |
| 130 | 1 | — | x | — | 7 | 0 | 0 |
| 131 | 1 | — | x | 6 | 8 | 1 | 0 |
| 132 | 1 | — | x | 6 | — | x | 0 |
| 133 | 1 | — | x | 6 | 8 | 0 | 0 |
| 134 | 1 | — | x | 5 | 7 | 1 | 0 |
| 135 | 1 | — | x | 5 | 8 | 1 | 0 |
| 136 | 1 | — | x | 5 | — | x | 0 |
| 137 | 1 | — | x | 5 | 8 | 0 | 0 |
| 138 | 1 | — | x | 5 | 7 | 0 | 0 |
| 139 | 1 | — | x | 5 | 7 | 0 | 0 |
| 140 | 1 | — | x | 5 | 6 | 0 | 0 |
| 141 | 1 | — | x | 5 | 6 | 0 | 0 |
| 142 | 1 | — | x | 4 | 7 | 1 | 0 |
| 143 | 1 | — | x | 4 | 8 | 1 | 0 |
| 144 | 1 | 3 | 0 | 4 | — | x | 1 |
| 145 | 1 | 3 | 0 | 4 | 8 | 1 | 1 |
| 146 | 1 | 3 | 0 | 4 | 7 | 1 | i |
| 147 | 1 | 3 | 0 | 5 | 6 | 0 | 1 |
| 148 | 1 | 3 | 0 | 5 | 6 | 0 | 1 |
| 149 | 1 | 3 | 0 | 5 | 7 | 0 | 1 |
| 150 | 1 | 3 | 0 | 5 | 7 | 0 | 1 |
| 151 | 1 | 3 | 0 | 5 | 8 | 0 | 1 |
| 152 | 1 | 3 | 0 | 5 | — | x | 1 |
| 153 | 1 | 3 | 0 | 5 | 8 | 1 | 1 |
| 154 | 1 | 3 | 0 | 5 | 7 | 1 | 1 |
| 155 | 1 | 3 | 0 | 6 | 8 | 0 | 1 |
| 156 | 1 | 3 | 0 | 6 | — | x | 1 |
| 157 | 1 | 3 | 0 | 6 | 8 | 1 | 1 |
| 158 | 1 | 3 | 0 | — | 7 | 0 | 1 |
| 159 | 1 | 3 | 0 | — | 8 | 0 | 1 |
| 160 | 1 | 3 | 0 | — | — | x | 0 |
| 161 | 1 | 3 | 0 | — | 8 | 0 | 0 |
| 162 | 1 | 3 | 0 | — | 7 | 0 | 0 |
| 163 | 1 | 3 | 0 | 6 | 8 | 1 | 0 |
| 164 | 1 | 3 | 0 | 6 | — | x | 0 |
| 165 | 1 | 3 | 0 | 6 | 8 | 0 | 0 |
| 166 | 1 | 3 | 0 | 5 | 7 | 1 | 0 |
| 167 | 1 | 3 | 0 | 5 | 8 | 1 | 0 |
| 168 | 1 | 3 | 0 | 5 | — | x | 0 |
| 169 | 1 | 3 | 0 | 5 | 8 | 0 | 0 |
| 170 | 1 | 3 | 0 | 5 | 7 | 0 | 0 |
| 171 | 1 | 3 | 0 | 5 | 7 | 0 | 0 |
| 172 | 1 | 3 | 0 | 5 | 6 | 0 | 0 |
| 173 | 1 | 3 | 0 | 5 | 6 | 0 | 0 |
| 174 | 1 | 3 | 0 | 4 | 7 | 1 | 0 |
| 175 | 1 | 3 | 0 | 4 | 8 | 1 | 0 |
| 176 | 0 | 2 | 1 | 4 | — | x | 1 |
| 177 | 0 | 2 | 1 | 4 | 8 | 1 | 1 |
| 178 | 0 | 2 | 1 | 4 | 7 | 1 | 1 |
| 179 | 0 | 2 | 1 | 5 | 6 | 0 | 1 |
| 180 | 0 | 2 | 1 | 5 | 6 | 0 | 1 |
| 181 | 0 | 2 | 1 | 5 | 7 | 0 | 1 |
| 182 | 0 | 2 | 1 | 5 | 7 | 0 | 1 |
| 183 | 0 | 2 | 1 | 5 | 8 | 0 | 1 |
| 184 | 0 | 2 | 1 | 5 | — | x | 1 |
| 185 | 0 | 2 | 1 | 5 | 8 | 1 | 1 |
| 186 | 0 | 2 | 1 | 5 | 7 | 1 | 1 |
| 187 | 0 | 2 | 1 | 6 | 8 | 0 | 1 |
| 188 | 0 | 2 | 1 | 6 | — | x | 1 |
| 189 | 0 | 2 | 1 | 6 | 8 | 1 | 1 |
| 190 | 0 | 2 | 1 | — | 7 | 0 | 1 |
| 191 | 0 | 2 | 1 | — | 8 | 0 | 1 |
| 192 | 0 | 2 | 1 | — | — | x | 0 |
| 193 | 0 | 2 | 1 | — | 8 | 0 | 0 |
| 194 | 0 | 2 | 1 | — | 7 | 0 | 0 |
| 195 | 0 | 2 | 1 | 6 | 8 | 1 | 0 |
| 196 | 0 | 2 | 1 | 6 | — | x | 0 |
| 197 | 0 | 2 | 1 | 6 | 8 | 0 | 0 |

TABLE-4-continued

| Index P 0:256 | Module 100' | | | Module 300' | | | Module 430 S |
|---|---|---|---|---|---|---|---|
| | I 0:1 | J 2:3 | K | L 4:6 | M 6:8 | N | |
| 198 | 0 | 2 | 1 | 5 | 7 | 1 | 0 |
| 199 | 0 | 2 | 1 | 5 | 8 | 1 | 0 |
| 200 | 0 | 2 | 1 | 5 | — | x | 0 |
| 201 | 0 | 2 | 1 | 5 | 8 | 0 | 0 |
| 202 | 0 | 2 | 1 | 5 | 7 | 0 | 0 |
| 203 | 0 | 2 | 1 | 5 | 7 | 0 | 0 |
| 204 | 0 | 2 | 1 | 5 | 6 | 0 | 0 |
| 205 | 0 | 2 | 1 | 5 | 6 | 0 | 0 |
| 206 | 0 | 2 | 1 | 4 | 7 | 1 | 0 |
| 207 | 0 | 2 | 1 | 4 | 8 | 1 | 0 |
| 208 | 0 | 3 | 1 | 4 | — | x | 1 |
| 209 | 0 | 3 | 1 | 4 | 8 | 1 | 1 |
| 210 | 0 | 3 | 1 | 4 | 7 | 1 | 1 |
| 211 | 0 | 3 | 1 | 5 | 6 | 0 | 1 |
| 212 | 0 | 3 | 1 | 5 | 6 | 0 | 1 |
| 213 | 0 | 3 | 1 | 5 | 7 | 0 | 1 |
| 214 | 0 | 3 | 1 | 5 | 7 | 0 | 1 |
| 215 | 0 | 3 | 1 | 5 | 8 | 0 | 1 |
| 216 | 0 | 3 | 1 | 5 | — | x | 1 |
| 217 | 0 | 3 | 1 | 5 | 8 | 1 | 1 |
| 218 | 0 | 3 | 1 | 5 | 7 | 1 | 1 |
| 219 | 0 | 3 | 1 | 6 | 8 | 0 | 1 |
| 220 | 0 | 3 | 1 | 6 | — | x | 1 |
| 221 | 0 | 3 | 1 | 6 | 8 | 1 | 1 |
| 222 | 0 | 3 | 1 | — | 7 | 0 | 1 |
| 223 | 0 | 3 | 1 | — | 8 | 0 | 1 |
| 224 | 0 | 3 | 1 | — | — | x | 0 |
| 225 | 0 | 3 | 1 | — | 8 | 0 | 0 |
| 226 | 0 | 3 | 1 | — | 7 | 0 | 0 |
| 227 | 0 | 3 | 1 | 6 | 8 | 1 | 0 |
| 228 | 0 | 3 | 1 | 6 | — | x | 0 |
| 229 | 0 | 3 | 1 | 6 | 8 | 0 | 0 |
| 230 | 0 | 3 | 1 | 5 | 7 | 1 | 0 |
| 231 | 0 | 3 | 1 | 5 | 8 | 1 | 0 |
| 232 | 0 | 3 | 1 | 5 | — | x | 0 |
| 233 | 0 | 3 | 1 | 5 | 8 | 0 | 0 |
| 234 | 0 | 3 | 1 | 5 | 7 | 0 | 0 |
| 235 | 0 | 3 | 1 | 5 | 7 | 0 | 0 |
| 236 | 0 | 3 | 1 | 5 | 6 | 0 | 0 |
| 237 | 0 | 3 | 1 | 5 | 6 | 0 | 0 |
| 238 | 0 | 3 | 1 | 4 | 7 | 1 | 0 |
| 239 | 0 | 3 | 1 | 4 | 8 | 1 | 0 |
| 240 | 0 | — | x | 4 | — | x | 1 |
| 241 | 0 | — | x | 4 | 8 | 1 | 1 |
| 242 | 0 | — | x | 4 | 7 | 1 | 1 |
| 243 | 0 | — | x | 5 | 6 | 0 | 1 |
| 244 | 0 | — | x | 5 | 6 | 0 | 1 |
| 245 | 0 | — | x | 5 | 7 | 0 | 1 |
| 246 | 0 | — | x | 5 | 7 | 0 | 1 |
| 247 | 0 | — | x | 5 | 8 | 0 | 1 |
| 248 | 0 | — | x | 5 | — | x | 1 |
| 249 | 0 | — | x | 5 | 8 | 1 | 1 |
| 250 | 0 | — | x | 5 | 7 | 1 | 1 |
| 251 | 0 | — | x | 6 | 8 | 0 | 1 |
| 252 | 0 | — | x | 6 | — | x | 1 |
| 253 | 0 | — | x | 6 | 8 | 1 | 1 |
| 254 | 0 | — | x | — | 7 | 0 | 1 |
| 255 | 0 | — | x | — | 8 | 0 | 1 |
| 256 | 0 | — | x | — | — | x | 0 |

Note that above Table-4 is periodic and repeats in the less significant columns (L,M,N) every 32 rows. This redundancy can be used to minimize the circuitry of mapping unit 450, as is well understood in the art.

Figure 4B:
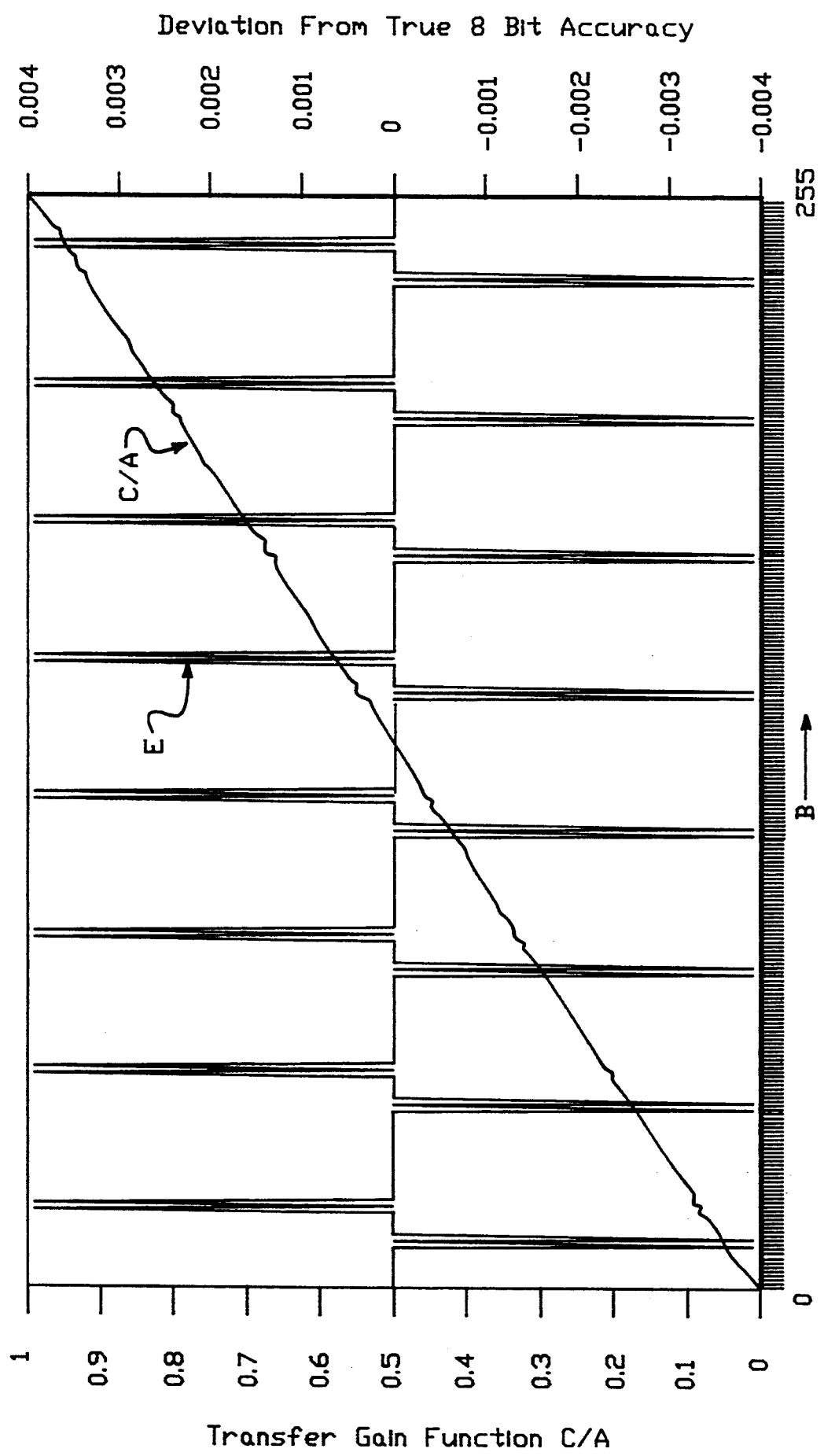

FIG. 4B is a plot showing the gain and error for one implementation of the n-by-8 bit pseudo multiplier module 400 for values of B equal to 0 through 255. Ideally, the gain curve C/A should be a straight line extending from the point B=0, C/A=0, to the point B=255, C/A=1.00. But as seen, the C/A curve deviates from the ideal, in the aggregate, for roughly one eighth of its overall length, while remaining on the ideal path for roughly, in the aggregate, seven eighths of its overall length. The deviation is better seen by the plot of the error, E=C-(A·B). The maximum error is plus or minus 1/256, which is just under four tenths of a percent. The direction of the error spikes can be varied, as already explained above, by picking appropriate substitutions for the cases of 11/16 and 13/16 as applied within the n-by-4 module 300'. The selected substitutions can create errors that are either all positive, all negative, counterposed positive and negative, or any other desired distribution at the points defined by P'''=11, 13, 19, 21, 43, 45, 51, 53, 75, 77, 83, 85, 107, 109, 115, 117, 139, 141, 147, 149, 171, 173, 179, 181, 203, 205, 211, 213, 235, 237, 243 and 245.

In the illustrated case, the error E distributes uniformly over B equals 0 to 255, and symmetrically relative to the zero error line. As such, this implementation is well suited for DSP applications that can tolerate a small, uniformly distributed error function. One such application is use of the n-by-pseudo8 multiplier module 400 for converting YCC formatted video signals into composite video signals. The format conversion requires quadrature modulation of the color baseband signals to form a corresponding chrominance signal using a process that relies on a set of multiplications. Both the CRT tube and the human eye tend to integrate out small errors in chrominance over space and time. As such, the small deviations between what is displayed and what would have been displayed if the chromiance had been generated by a true n-by-8 multiplier instead of by the n-by-⅞ multiplier module 400, is tolerable.

It is recognized in the art of modulator design that one obtains approximately 6 db (decibels) for each additional bit added to the multiplier (B) signal. Under this sense, the least significant multiplier bit of the n-by-pseudo8 multiplier module 400 can be said to add an addition of approximately 5 db (which is roughly ⅚ths of 6 db) to the resolution or gain of the system. This additional 5 db is usable in applications where the accompanying error can be tolerated as is, or statistically averaged out.

Referring momentarily back to FIG. 4A, it should be noted that the compact layout topology 200 of FIG. 2 can be applied to FIG. 4A. Bus 409 runs in parallel next to the multiplexers 110, 120, 310, 320 of n-by-3 module 100' and n-by-4 module 300'. Control lines I, J, K, L, M, N and S also run in parallel through the various multiplexers of elements 100', 300' and 430 for providing appropriate shift-amount selection and sign-selection functions.

The signal propagation delay of the n-by-⅞ multiplier module 400 is relatively small. Adder/subtractor unit 430 can begin to generate the less significant bit of the result signal C as soon as the less significant bits (LSB's) of the first and second partial result signals, $R_1$ and $R_2$, become valid. The general-purpose propagation time for performing an n-by-⅞ multiplication (assuming that new values are supplied at the same time for both the multiplicand A signal and the multiplier B signal) is roughly equal to the sum of time delays through mapping unit 450, plus the time for generating the less significant result bits in the n-by-3 module 100' and in the n-by-4 module 300', plus the time for propagating the rest of the result out from the n-by-3 module 100' and in the n-by-4 module 300'. This general-purpose propagation time is reduced somewhat due to partial concurrence of delays through mapping unit 450 and delays through n-by-3 module 100' and n-by-4 module 300'.

Figure 5:
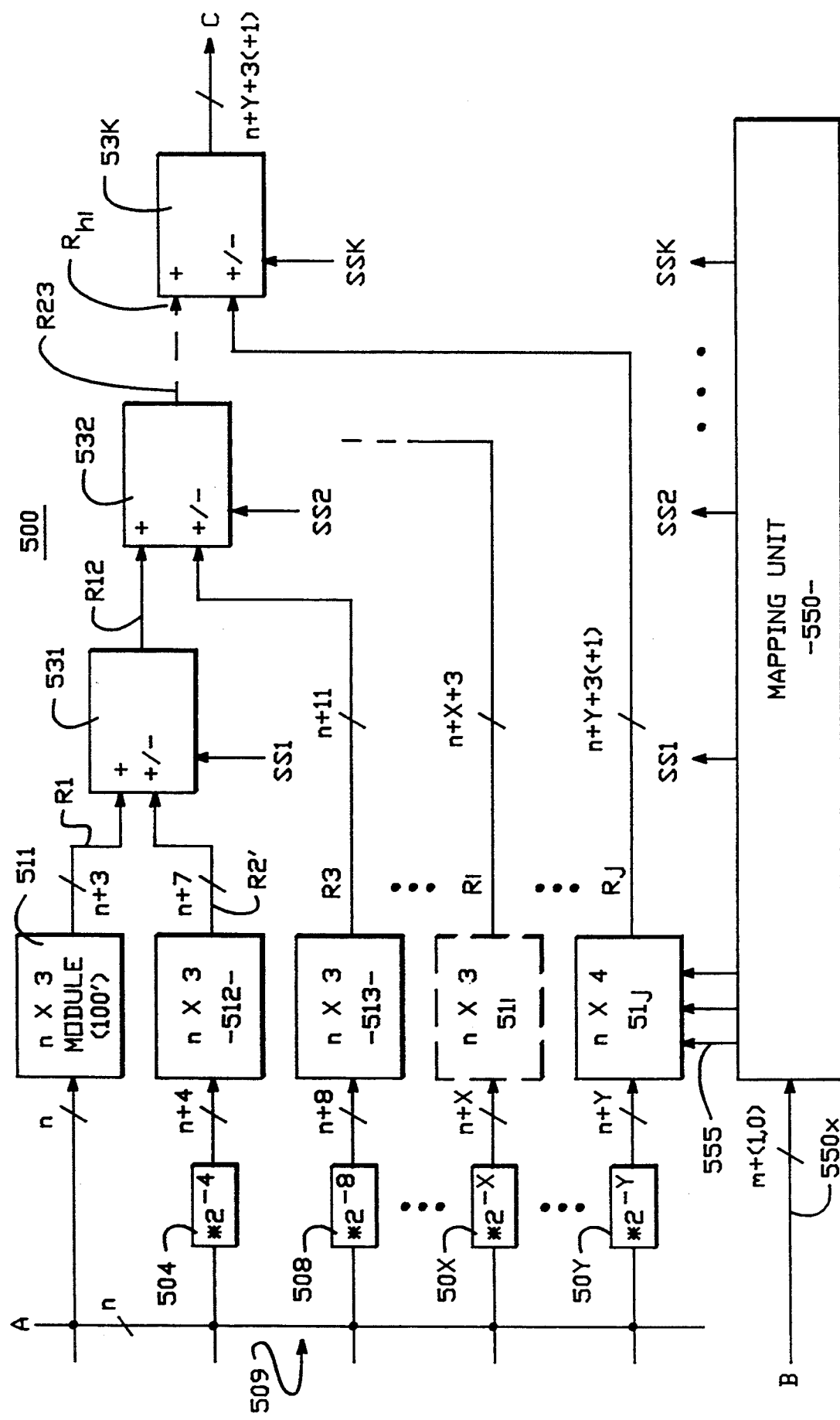
FIG. 5 is a block diagram of an n-by-m bit true multiplier system or, alternatively, an n-by-(m+1) bit pseudo multiplier system composed of plural graduator modules in accordance with the invention.

FIG. 5 is a block diagram of an n-by-m bit true multiplier system 500 or, alternatively, an n-by-(m+1) bit pseudo multiplier system or, alternatively, an n-by-m/(m+1) "graduator" system in accordance with the invention. This structure is formed by generalizing the structure shown in FIG. 4A. Coarse approximations are corrected with ever finer adjustments to realize a desired level of accuracy and/or precision.

An n-lines wide bus 509 carries the n bits of the multiplicand signal (A). A series of n-by-3 modules (n×3) 511, 512, 513, . . . , 51i are operatively coupled to this multiplicand A signal supply bus 509. Each of the n-by-3 modules (n×3) 511, 512, etc., preferably has a structure corresponding to module 100' of FIG. 1 and more preferably according to the compact topology 200 of FIG. 2. One or more copies of the n-by-m/(m+1) multiplier system 500 may be placed either integrally on a monolithic integrated circuit (IC) chip which has bus 509 extending on the chip or on a multi-chip carrier module (MCM) or multi-chip printed circuit board which has bus 509 extending on the MCM substrate or on the board.

The topology of system 500 can even be conveniently programmed into a field-programmable gate array device (FPGA) such that of the Xilinx XC4000 ™ family (available from Xilinx Inc. of San Jose, Calif.) because the control signals can be subdivided into small parallel clusters of 3 or 4 bits each and the n bits-wide multiplicand A signal can also be parsed into clusters of bits that are operated on by the small clusters of control signals.

The n bits-wide, multiplicand A signal supply bus 509 connects directly to the multiplicand input of the first n-by-3 module 511. Consequently, the first partial result signal $R_1$ of module 511 has an effective width of n+3 bits and represents multiples of A in minimal graduations of eighths. ($R_1 = A \cdot P/8$ for P=0 to 7 or P=1 to 8.)

A $*2^{-4}$ prescaler 504 is interposed between the multiplicand A signal supply bus 509 and the second n-by-3 module 512. The second partial result signal $R_2'$ of module 512 accordingly has an effective width of n+7 bits and represents multiples of A in "more finely-granulated" minimal graduations of 128ths. ($R_2' = A \cdot P'/128$ for P'=0 to 7 or P'=1 to 8.)

In other words, the minimal graduations of the second module 512 are one-sixteenth (1/16th) the minimal graduations of the first module 511. Note that variable P' has only eight quantization levels (P'=0 to 7 or P'=1 to 8). Note further, however, that the graduations produced by the second module 512 will be selectively added to, or subtracted from, the graduations produced by the first module 511 in a not-yet introduced, adder/subtractor unit 531.

The capability to both add and subtract the finer graduations of the second module 512 gives the eight, so-called P' quantization levels an effective range of 16 points rather than just 8. This is why prescaler 504 is set to provide prescaling by one-sixteenth rather than by one-eighth. And because of this, the combination of the second n×3 module 512 with the first n×3 module 511 synergistically defines part of an n×7 multiplier rather than merely an n×6 multiplier. (In terms of synergistic math, it appears that 3n+3n becomes 7n instead of 6n. Actually, there is no magic here. The 7th "n" comes from the sign selection bit SS1 applied to the subsequent adder/subtractor unit 531.) The n×7 multiplier is completed by adding the not-yet but soon-to-be introduced, adder/subtractor unit 531 and mapping control unit 550.

A $*2^{-8}$ prescaler 508 is interposed between the multiplicand A signal supply bus 509 and the third n-by-3 module 513. The third partial result signal $R_3$ of module 513 therefore has an effective width of n+11 bits and represents multiples of A in "even more finely-granulated" minimal graduations of A/2048. ($R_3 = A \cdot P''/2048$ for P=0 to 7 or P=1 to 8.)

The granularity of partial result values generated by each next successive module (e.g., 514, not shown) continues to reduce in this manner. Each next succeeding n×3 module produces a partial result signal representing multiples of A in minimal graduations that are one-sixteenth ($=2^{-4}$) that of the previous, more-significant module so as to fill in value gaps between the coarser graduations of the previous module.

Accordingly, the i-th n-by-3 module (shown as module 51i) of the series 511, 512, etc. has a $*2^{-X}$ prescaler 50 X interposed between it and the multiplicand A signal supply bus 509, where X=4(i−1). The i-th partial result signal $R_i$ of module 51i has an effective width of n+X+3 bits (=n+4(i−1)+3 bits) and represents multiples of A in "even more finely-granulated" minimal graduations of $A*2^{-(4(i-1)+3)}$. ($R_i = A \cdot P^i * 2^{-(4(i-1)+3)}$ for $P^i = 0$ to 7 or $P^i = 1$ to 8.)

The last module 51j in the series, 511–51j, is preferably an n-by-4 module (n×4) structured similarly to module 300' of FIG. 3. This j-th module has a $*2^{-Y}$ prescaler 50 Y interposed between it and the multiplicand A signal supply bus 509, where Y=4(j−1). The j-th partial result signal $R_j$ of module 51j has an effective width of n+Y+4 bits (=n+4(j−1)+3+1 bits) and represents multiples of A in minimal graduations of $A*2^{-(4(j-1)+4)}$. ($R_j = A \cdot P^j * 2^{-(4(j-1)+4)}$ for $P^j = 0$ to 15 or $P^j = 1$ to 16.) The n-by-4 module 51j produces a partial result signal $R_j$ representing multiples of A in minimal graduations that are one-thirtysecond (1/32nd) that of the previous module.

A series of adder/subtractor units 531, 532, . . . , 53k are further provided in the n-by-m/(m+1) multiplier or "graduator" system 500 as shown, each having a corresponding sign-select terminal, SS1 through SSk. The $R_1$ output of first module 511 defines a first-level approximation of the desired target output, C. Adder/subtractor unit 531 receives the coarse R1 and finer-adjusting R2' partial result signals, and produces a second-level, partial result signal R12 representing the sum or difference of the R1 and R 2' partial result signals. Adder/subtractor unit 532 receives the R12 and R3 partial result signals, and produces a third-level partial result signal R23 representing the sum or difference of the R12 and R3 partial result signals. The granularity of $R_3$ is finer than that of $R_2$ so that finer adjustments can be made to the second-level, partial result signal R12 in order to get closer, when necessary to the desired target output, C. This sequence continues through to the last adder/subtractor unit 53k which receives the partial result signal Rhi from the preceding adder/subtractor unit 53h (not shown) and also the Rj partial result signal from the n×4 module 51j. The last adder/subtractor unit 53k outputs result signal C. The result signal C has an effective bit width of n+m+(1 or 0) =n+Y+3+(1 or 0), the last bit being added if pseudo multiplication is to be tolerated or not added if true multiplication is to be required.

There are k=(j−1) adder/subtractor units 531–53k in the n-by-m/(m+1) multiplier system 500 of FIG. 5. When these adder/subtractor units 531–53k are implemented in accordance with a carry ripple design, signal propagation delay through system 500 can be defined as n+(j−2) ripple-carry delays, where a ripple carry delay is the time needed to generate the least significant output bit of one such ripple-carry adder unit.

A mapping control unit 550 is further provided in the n-by-m/(m+1) multiplier or "graduator" system 500 as shown, for receiving an m-bits wide (or alternatively an m+1 bits-wide), multiplier defining signal (B) at an input port 550x and mapping that signal (B) into corresponding values of P, P', P", etc and converting these P, P', P", etc. values into appropriate control signals 555 that are applied to modules 511 through 51j and into the sign-select signals, SS1 through SSk that are applied to adder/subtractor units 531 through 53k. Mapping control unit 550 can be configured so that result signal C represents or substantially approximates the value A·P/$2^u$ for all integer values of P in the range 0 to $2^u-1$ (or alternatively, $1 \leq P \leq 2^u$), where u is an integer defining a desired upper level of precision (u is equal to m or m+1) and P is a mapped function of the input signal B that is presented to control port 550x of mapping unit 550.

It is to be noted that the last graduator module in the series 511-51j does not have to be an n×4 module. It can instead be an n×3 module (or even a graduator of fewer last-stage graduations such as an n×2 module described later, below). The bit width, m, of the multiplier B input port 550x will vary in general, in accordance with the number of n×3 graduator modules that are used and the number of A·P/$2^u$ values that are to be made selectively available. The first graduator module 511 allows for a multiplier B signal that is 3 bits-wide. Adding the second graduator module 511 (and the first adder/subtractor unit 531) extends the allowed resolution of the multiplier B signal to 7 bits-wide (7=3+3+1). Adding the third graduator module 513 (and the second adder/subtractor unit 532) extends the allowed resolution of the multiplier B signal by another 4 bits so that it can be 11 bits-wide (11=3+3+3+1+1). Each further added n×3 graduator module extends the allowed resolution of the multiplier B signal by another 4 bits. If the last added graduator module is an n×4 type instead of an n×3 type, the corresponding extension of B is by 5 bits instead of by 4 bits.

The below Table-5 shows this progression of improved resolution in the B signal as one adds more n×3 graduator modules.

TABLE-5

| Number of nX3 Graduator Modules | Optimum Number of Useful B bits |
| --- | --- |
| 1 | 3 |
| 2 | 7 |
| 4 | 15 |
| 8 | 31 |
| 16 | 63 |
| 32 | 127 |

The general formula for the optimal number of usable B bits is:

*Precision in number of bits*=3j+k+(0 or 1);

wherein j is the total number of n×3 or better graduator modules, k is the number of adder/subtractor units and the last term is a one or zero depending on whether or not the last graduator module 51j is a n×4 type and whether or not the last bit of pseudo resolution provided by such an n×4 graduator module is usable in the application environment.

It is to be further noted that the shift operations of prescalers 504, 508, ..., 50i, ..., 50j are preferably integrated into the internal shift operations of their respective graduator modules 512, 513, ..., 51i, ..., 51j rather than being performed separately. The prescaling factor does not of necessity have to geometrically progress by amounts of *$2^{-4}$. This is merely considered the optimum amount for obtaining maximum performance from each graduator module added to the system.

Each added graduator module does not have to be of an n×3 type. In some circumstances it may be advisable to scale performance by adding n×2 graduator modules. An n×2 graduator module has substantially the same design as shown in FIG. 1 for the n×3 graduator module except that the *⅛ prescaler 103 is deleted, multiplexer input port 120b is deleted and mapping control unit 150 is simplified to eliminate the selection multiplexer input port 120b. In such a case, the minimum graduations of output port 130o (FIG. 1) is in terms of A/4 instead of A/8.

By the same token, the granularity of the n×3 graduator module 100 shown in FIG. 1 can be even more severely reduced by eliminating both of prescalers 90 and 103 and their corresponding circuitry in multiplexers 110 and 120, and the corresponding control circuitry in mapping control unit 150. For lack of an appropriately meaningful name, such a severely crippled graduator module will be referred to here as an n×1.5 graduator module. It can produce a result signal C representing A*[(0 or 0.5)±(0 or 0.25)]. In some circumstances it may be useful to use such a n×1.5 graduator module as a last or other stage in a graduator system. In yet other circumstances it may be useful to use an even more primitive, n×1 graduator module as a last or other stage in a graduator system. An n×1 graduator module is simply the prescale-shifted multiplicand A bus with no processing logic attached.

Referring back to FIG. 5, the illustrated circuit configuration is disadvantageous from the point of view of scalability because signal propagation delay increases at least linearly as more and more graduator modules are added.

FIG. 6 shows another, more preferred topology 600. Like reference symbols and numbers in the "600" series are used for elements of FIG. 6 which correspond to but are not necessarily the same as the elements represented by similar symbols and reference numbers of the "500" series in FIG. 5. As such, a detailed description of the elements found in FIG. 6 is omitted here.

Rather than cascading all the adder/subtractor units in series as was done in FIG. 5, the adder/subtractor units 631-63h, 641-642 and 660 of FIG. 6 are arranged in a parallel/serial fashion. The resultant concurrency of merge operations, where fine adjustment values are added to or subtracted from coarser approximation values, helps to reduce the worst-case signal propagation time of the illustrated topology 600.

In a first sum/difference forming stage 630, adder/subtractor unit 632 begins to form a sum or difference of partial result signals, $R_3$ and $R_4$, at the same time that adder/subtractor unit 631 begins to form a sum or difference of partial result signals, $R_1$ and $R_2$. Adder/subtractor unit 63h simultaneously begins to form a sum or difference of partial result signals, $R_i$ and $R_j$. The number, j, of graduator modules 611-61j is preferably even so that respective outputs from each successive pair of graduator modules merge into a corresponding stage 630 adder/subtractor unit 631, 632, ..., 63h, where h=j/2.

In a second sum/difference forming stage 640, that succeeds first sum/difference forming stage 630, pairs of sums produced by the first sum/difference forming stage 630 are added to or subtracted from second stage results such as $R_{ij}=R_i \pm R_j$. And in a third sum/difference forming stage 660, that succeeds second sum/difference forming stage 640, pairs of sums produced by the second sum/difference forming stage 640 are added to or subtracted from third stage results such as $R_{ghij}=R_{gh} \pm R_{ij}$. The stages continue for as many times as necessary to produce a result signal C of a desired precision. The advantage of this architecture 600 is that it reduces the overall signal propagation delay time.

In light of the above, those skilled in the art will recognize that many other topologies are possible for merging fine adjustment terms (the less significant terms) with coarser approximation terms (the more significant terms). A topology having $2^x$ graduators, where x=1,2,3,..., is preferred in order to support a binary-tree merging topology of the type suggested by FIG. 6.

The above disclosure is to be taken as illustrative of the invention, not as limiting its scope or spirit. Numerous modifications and variations will become apparent to those skilled in the art after studying the above disclosure.

By way of example, in cases where small circuit size is more important than speed; some or most of the above described operations can be performed in serial-over-time fashion rather than in the disclosed parallel-over-space fashion. The underlying process is to form first-level, coarse approximation and fine adjustment signals through physical shifting of a given multiplicand signal, A. A fine adjustment signal is added to or subtracted from a coarse approximation signal in order to generate a result signal representing a target value (C) or more closely approximating the target value (C) than did the initial coarse approximation signal. The process can be compounded to construct approximations and adjustments of ever finer granularity.

With regard to FIGS. 1 and 3, it is to be understood that the number of input ports per multiplexer and the shift operations performed at each input port are not limited to what is shown. The illustrated shift amounts can be scaled by any desired power of two. The scale of zero through A times 1.00 was used merely for purposes of normalization. The number of lines in each of the illustrated buses can be increased or decreased as appropriate. In some applications, the less significant bits of a result signal (R or C) can be truncated away when not needed and rounding may be provided where desirable in combination with such truncation.

With regard to FIG. 2, it is to be understood that there are alternative circuits for implementing the barrel shifting and summing functions of FIGS. 1 and 3. The multiplexers can be of a classical AND/OR gate construct instead of the illustrated pass-transistor construct. Technologies other than CMOS (complementary metal-oxide-semiconductor) can be used, such as for example, bipolar transistor logic. Sign selection for the adder/subtractor unit can be implemented with a bank of exclusive-OR gates (XOR's) following noninverting outputs of the multiplexers that determine shift-amount for each of the term signals ($T_i$, $T_j$). Signal amplification by inverters 214 and 215 is optional and may be eliminated. Shifting and adding/subtracting can be each alternatively carried out by serial units rather than the illustrated parallel units. Data storage registers may be added where appropriate to hold temporary results of serial, over-time operations.

With regard to FIGS. 5 and 6, the higher level adjustment stages (531, 532, 53k, 630, 640, 660) do not have to have selectable add and subtract functions. Instead, the finer adjustment values (e.g., R2, R4, Rj) can be signed values. Recall that each of the finer granularity modules (512–515, 612–615) can be made to have a transfer function of the form $C=A \cdot (B+F)/Q$, where B is a supplied index signal, Q is a power of two that defines the granularity, and F can be a positive or negative offset constant. If F is an appropriate negative value, C can swing to both plus and minus even though B is always positive. Thus the finer adjustment signals can have the sign-select built into them rather than occurring in a follow up operation.

With regard to the polarity of the supplied multiplicand A and multiplier B signals, there are four variations: both positive, both negative, A is positive while B is negative, and A is negative while B is positive. Much of the above discussion has assumed that both A and B are positive binary-coded digital signals. It is well within the purview of those skilled in the art to make appropriate modifications for handling signed multiplications. Either the input signals (A and B) can be converted to be both positive before application to a multiplier circuit in accordance with the invention and the result signal C can be afterwards negated as necessary; or equivalent shift and control operations can be performed within the graduator modules to provide a binary-coded result signal C of appropriate polarity.

It is worthwhile to summarize here some of the particularly advantageous features of the invention that may have escaped notice in the detailed discussion. First, there is no limit on the size of the multiplicand A signal. It can be any arbitrary number, n, of bits-wide (e.g., 16, 32, 64, 128, and so forth). The size of the multiplier B signal is limited primarily by the fact that within each sum/difference-of-2 terms module, only integers in the range $-10$ to $+10$ can be precisely formed as a sum or difference of just two term signals ($T_i$ and $T_j$), where each term signal represents either zero or A multiplied by a power of two. For general purposes, the optimal size for the B signal is believed to be 3 bits and hence, the n×3 module 100' of FIG. 1 forms the basic building block for creating combination systems that can handle multiplier B signals of more than 3 bits.

Second, the n×3 module 100' of FIG. 1 provides an area efficient structure when implemented according to the topology 200 of FIG. 2. This topology meshes smoothly into the multi-module topologies of FIGS. 5 and 6 because the same multiplicand A signal is distributed in parallel by one bus (509, 609) to all the graduator modules.

Third, there is a basic control scheme within the n×3 building block module 100' of FIG. 1 that scales nicely into the control scheme used by aggregate systems that combine many such building blocks. Put simply, coarse approximation signals are augmented both constructively and destructively by fine adjustment signals to provide a full range of values having a desired granularity. In the multi-module systems such as shown by FIGS. 4A, 5 and 6, this basic control scheme is repeated by providing both additive and subtractive fine adjustments of different granularities to coarser approximation signals. This has the benefit of doubling the adjustment range provided by the modules that generate the fine adjustment signals.

The repetition of the basic control scheme within and outside the n×3 building block modules 100' produces a number of periodicities in the patterns of control signals (e.g., I,J,K,L,M,N,S) that need to be developed by the mapping control units (150, 350, 450, 550 or 650). These periodicities permit significant reduction in the circuit size of the mapping control units (150, 350, 450, 550 or 650) by means of Karnough or other well-known circuit minimization techniques.

Fourth, output production time is reduced by the fact that the multiplicand A signal undergoes significance translation (A is barrel shifted) at the same time that decoding of the multiplier B signal begins. The concurrence of these operations works to reduce the overall signal propagation delay time of the system.

Fifth, the fundamental operation for providing multiplication by a wide variety of multipliers B (where B is not necessarily a power of two) is based in the aggregate on the idea of simultaneously multiplying a same multiplicand A signal by two or more powers of two. Then sums or differences of the results are generated. The simultaneous multiplications of the multiplicand A signal by various powers of two can be performed quickly and with minimal circuitry. This further works to reduce the overall signal propagation delay time of the system.

Sixth, because the merging of finer adjustments with coarser approximation signals happens in successive stages (e.g., 630, 640, 660 of FIG. 6), the sign select (S or SSi) control signals that control downstream merges do not have to be generated as quickly as those (I,J,L,M) that control upstream selection of the shift amounts and those (K,N) that control the first round of additions and subtractions. Designers can optimize the circuitry of the mapping control unit (e.g., 650) to take advantage of this phenomenon by having it generate the most upstream control signals (I,J,L,M) in the least amount of practical time, then the next needed, midstream control signals (K,N), and lastly the downstream control signals (S or SSi).

As a seventh and final point, it should be noted that the concept of an imperfect yet still useful multiplier module (FIG. 3) has been introduced. A significant improvement in the signal to noise ratio of many DSP applications can be obtained (approximately a 5 db gain) by using the n×4 design of FIG. 3 as the only or last in a series of graduator modules. An inherent and statistically-based error averaging effect can be found in many DSP applications. This will depend on the statistical distribution of the various multiplier B codes supplied in a given DSP system. Appropriate selection of the polarity of errors at points corresponding to P/Q=11/16 and P/Q=13/16 can combine with the statistically-based error averaging effect to greatly reduce what at first appears to be an intolerable amount of error (or "noise"). In applications where the multiplier B signals tend to have a zero average over time and distribute uniformly in the positive and negative directions, it is generally advisable to provide a symmetrical distribution of counterposed positive and negative errors as one moves across the spectrum of possible values for B. They will tend to cancel one another out over time. In some unidirectional systems such as servo positioning systems, it is not desirable to have both positive and negative pointing errors since this only works to double the positional imprecision of the system. In such a case, it will be advisable to instead direct all the errors at points corresponding to P/Q=11/16 and P/Q=13/16 to be either all positive or all negative. Variations to these general suggestions will of course develop due to the peculiarities of specific applications.

Given the above disclosure of general concepts and specific embodiments, the scope of protection sought is to be defined by the claims appended hereto.

What is claimed is:

1. A multiples generating apparatus for generating physical signals representing rational multiples of a value A represented by a received, digital multiplicand signal (A), the apparatus comprising:
   (a) plural shifting means, each receiving said multiplicand signal (A) and each receiving one of plural shift control signals, each of the shifting means being for shifting the received multiplicand signal (A) and producing therefrom, in response to the corresponding shift control signal, a term signal either representative of the multiplicand (A) multiplied by two raised to an integer power or representative of a nullity;
   (b) summing means, operatively coupled for receiving term signals from two or more of said plural shifting means and for producing a physical result signal representing a sum or difference of the received term signals; and
   (c) mapping control means, operatively coupled to the plural shifting means, for receiving a supplied index signal (B) and responsively outputting the shift control signals to each of the plural shifting means such that the result signal produced by the summing means represents a multiple of the received multiplicand signal (A) having the form, A·P/Q, where Q is an integer equal to two raised to an integer power (Q=2$^j$) and P is an integer selected from a series of integers in accordance with a predefined mapping of B to P.

2. A multiples generating apparatus according to claim 1
   wherein the summing means includes sign control means responsive to the mapping control means for determining whether each one or more of the term signals is added or subtracted to produce the result signal; and
   wherein the mapping control means outputs a sign select signal to the sign control means, in response to the supplied index signal (B), for determining whether each one or more of the termsignals is added or subtracted to produce the result signal.

3. A multiples generating apparatus according to claim 1
   wherein P is an integer selected from a sequential series of integers in accordance with a predefined linear mapping of B to P such that the result signal is of the form, R=A·(B+F)/Q, where B is the supplied index signal and F is an offset constant.

4. A multiples generating apparatus according to claim 1
   wherein P is an integer selected from the sequential series of integers: 0, 1, 2, . . . , Q, Q+1, Q+2, . . . , in accordance with a predefined linear mapping of B to P such that the result signal is of the form, R=A·(B+F)/Q, where B is the supplied index signal and F is an offset constant.

5. A multiples generating apparatus according to claim 4
wherein Q is equal to 8 and P is an integer selected from eight consecutive integers in the series of integers: 0, 1, 2, ..., Q.

6. A multiples generating apparatus according to claim 1
wherein P is an integer selected from the consecutive series of integers: 0, 1, 2, ..., Q, Q+1, Q+2, ..., in accordance with a predefined mapping of B to P such that, for a majority of values of P, the result signal is of the form, R=A·(B+F)/Q, where B is the supplied index signal and F is an offset constant.

7. A multiples generating apparatus according to claim 6
wherein Q is equal to 16 and p is an integer selected from fourteen integers in the consecutive series of integers: 0, 1, 2, ..., Q.

8. A multiples generating apparatus according to claim 1 wherein the generated result signal represents in real-time a physical quantity selected from the group consisting of: (d.1) real-time tomography measurement signals; (d.2) real-time medical diagnosis or treatment signals; (d.3) real-time audio or ultrasonic sound signals; (d.4) real-time video signals; (d.5) real-time telecommunication signals; and (d.6) real-time adaptive-filtering coefficients.

9. A multiples generating apparatus according to claim 1 wherein the mapping control means includes a combinatorial logic circuit.

10. A multiples generating apparatus according to claim 1 wherein the mapping control means includes one of a ROM, PROM, EEPROM or other random access memory device.

11. A multiples generating apparatus for generating signals representing multiples of a value A represented by a received multiplicand signal (A), the apparatus comprising:
(a) a plurality of partial result generating modules where each module includes:
  (a.1) plural shifting means, each receiving said multiplicand signal (A) and each receiving one of plural shift control signals, each of the shifting means being for shifting the received multiplicand signal (A) and producing therefrom, in response to the corresponding shift control signal, a term signal either representative of the multiplicand (A) multiplied by a power of two or representative of a nullity; and
  (a.2) first-level summing means, operatively coupled for receiving term signals from two or more of said plural shifting means and for producing a partial result signal representing a sum or difference of the received term signals;
(b) second-level summing means, operatively coupled for receiving partial result signals from two or more of said plural modules and for producing a second-level result signal representing a sum or difference of the received partial result signals; and
(c) mapping control means, operatively coupled to the plural plurality of partial result generating modules and to the second-level summing means, for receiving a supplied index signal (B), for responsively outputting the shift control signals to each of the plural shifting means in each module, and for responsively outputting sign select signals to each of the firstlevel and second-level summing means, such that the second-level result signal produced by the second-level summing means represents a multiple of the received multiplicand signal (A) having the form, A·P/Q, where Q is an integer equal to two raised to an integer power ($Q=2^j$) and P is an integer selected from a series of integers in accordance with a predefined mapping of B to P.

12. A multiples generating circuit for generating electrical signals representing rational multiples (A·P/Q) of a value A represented by a received, binary-coded multiplicand signal (A), the circuit comprising:
(a) a plurality of or-constant shifters, each receiving said multiplicand signal (A) and each receiving one of plural, or-constant control signals, each of the or-constant shifters including circuitry, responsive to a corresponding or-constant control signal for either shifting the received multiplicand signal (A) and producing therefrom a term signal representative of the multiplicand (A) multiplied by two raised to an integer power or producing a term signal representative of a predefined constant;
(b) a summing circuit, operatively coupled to the or-constant shifters for receiving term signals from two or more of said plurality of or-constant shifters and for producing a result signal representing a sum or difference of the received term signals; and
(c) mapping control means, operatively coupled to the plurality of or-constant shifters, for receiving a supplied index signal (B) and responsively outputting the or-constant control signals to each of the plurality of or-constant shifters such that the result signal produced by the summing means represents a multiple of the received multiplicand signal (A) having the form, A·P/Q, where Q is an integer equal to two raised to an integer power ($Q=2^j$) and P is an integer selected from a series of integers in accordance with a predefined mapping of B to P.

13. A multiples generating circuit according to claim 12 wherein each or-constant shifter comprises:
(a.1) a multiplexer having a plurality of input ports, an output port for outputting a signal presented to a selected one of the multiplexer input ports, and a selection control port for selecting one of said multiplexer input ports;
(a.2) a plurality of digital shifters, each coupled to receive the multiplicand signal (A) and to output a corresponding and differently shifted version of the multiplicand signal ($A*2^{-i}$) to a corresponding one of said multiplexer input ports; and
(a.3) constant-defining means for applying a constant-representing signal to a corresponding one of said multiplexer input ports.

14. A multiples generating circuit according to claim 13 further comprising:
(d) a multiplicand supply bus coupled to each of the digital shifters for simultaneously supplying the multiplicand signal (A) to each of the digital shifters.

15. A multiples generating circuit according to claim 14 wherein each of the plural digital shifters is a fixedly-wired parallel shifter.

16. A multiples generating circuit according to claim 12 wherein the summing circuit includes a two-port adder/subtractor unit having respective first and second input ports for receiving respective first and second term signals from two of said plurality of or-constant shifters and having an output port for producing said result signal, the two-port adder/subtractor unit further having a sign-select control port for receiving a sign-control signal that defines whether the result signal represents a sum or difference of the first and second term signals.

17. A multiples generating circuit according to claim 16 wherein the mapping control means includes a combinatorial logic circuit for decoding the supplied index signal (B) and responsively outputting the or-constant control signals and the sign-control signal.

18. A multiples generating apparatus for generating a succession of physical signals representing a succession of rational multiples of a value A, where the value A is represented by a received, binary-coded multiplicand signal (A), said apparatus comprising:
  (a) a plurality of or-constant shifting means, each or-constant shifting means receiving said multiplicand signal (A) and each receiving one of plural shift or-constant control signals,
    (a.1) each of the or-constant shifting means including shift means for shifting the received multiplicand signal (A), and
    (a.2) each of the or-constant shifting means further including term-producing means, operatively coupled to the corresponding shift means, for producing, in response to a corresponding shift or-constant control signal, a term signal either representative of the multiplicand (A) multiplied by two raised to an integer power or representative of a predefined constant;
  (b) summing means, operatively coupled for receiving term signals from two or more of said plural or-constant shifting means and for producing a physical result signal representing a sum or difference of the received term signals; and
  (c) mapping control means, operatively coupled to the plural or-constant shifting means, for outputting a succession of the shift or-constant control signals to the or-constant shifting means such that the result signal produced by the summing means represents a succession of rational multiples of the value A of the received multiplicand signal (A), each of said multiples having the form, A·P/Q, where Q is an integer equal to two raised to an integer power ($Q=2^j$) and P is a corresponding one of a succession of integers selected from a predefined series of integers.

19. A multiples generating apparatus according to claim 18 wherein said summing means includes a carry look-ahead adder.

20. A multiples generating apparatus according to claim 18 wherein said summing means includes a carry-ripple adder.

21. A multiples generating circuit for generating electrical signals representing rational multiples of a value A, where the value A is defined by a supplied, binary-coded multiplicand signal (A), the circuit comprising:
  (a) a plurality of or-constant shifters, each receiving said multiplicand signal (A) and each receiving one of plural, or-constant control signals, each of the or-constant shifters including circuitry, responsive to a corresponding or-constant control signal for either shifting the received multiplicand signal (A) and producing therefrom a term signal representative of the multiplicand (A) multiplied by two raised to an integer power or producing a term signal representative of a predefined constant;
  (b) a summing circuit, operatively coupled to the or-constant shifters for receiving term signals from two or more of said plurality of or-constant shifters and for producing a result signal representing a sum or difference of the received term signals; and
  (c) an inferential mapping means, operatively coupled to the plurality of or-constant shifters, for outputting the or-constant control signals to each of the plurality of or-constant shifters such that the result signal produced by the summing means represents a multiple of the received multiplicand signal (A) having the form, A·P/Q, where Q is an integer equal to two raised to an integer power ($Q=2^j$) and P is an integer selected from a series of integers in accordance with a predefined mapping of an inferentially defined variable, B, to P.

22. A multiples generating circuit according to claim 21 wherein the inferential mapping means includes a cyclical storage means for storing and cyclically outputting a predefined sequence for each of the or-constant control signals.

23. A multiples generating apparatus for generating physical signals representing a succession of rational multiples of a value A, where the value A is represented by a received, binary-coded multiplicand signal (A), said apparatus comprising:
  (a) a plurality of or-constant shifting means, each or-constant shifting means receiving said multiplicand signal (A) and each receiving one of plural shift or-constant control signals, each of the or-constant shifting means being for shifting the received multiplicand signal (A) and producing therefrom, in response to a corresponding shift or-constant control signal, a term signal either representative of the multiplicand (A) multiplied by two raised to an integer power or representative of a predefined constant;
  (b) summing means, operatively coupled for receiving term signals from two or more of said plural or-constant shifting means and for producing a physical result signal representing a sum or difference of the received term signals; and
  (c) inferential mapping means, operatively coupled to the plural or-constant shifting means, for outputting a succession of shift or-constant control signals to each of the plurality of or-constant shifting means such that the result signal produced by the summing means represents a succession of multiples of the received multiplicand signal (A), each multiple having the form, A·P/Q, where Q is an integer equal to two raised to an integer power ($Q=2^j$) and p is a corresponding integer selected from a succession of integers within a predefined range of integers, in accordance with a predefined mapping to P of an inferentially-defined, time-varying signal, B.

24. A multiples generating apparatus according to claim 23 wherein said time-varying signal, B is periodic and the inferential mapping means includes a circulating shift register for storing and cyclically outputting a predefined sequence for each of the shift or-constant control signals.

25. An integrated circuit comprising:
  (a) a substrate;
  (b) a first bus having at least n+1 lines extending along said substrate where n is greater than three, at least one of the n+1 lines being a constant-maintaining line for maintaining a constant logic level, and at least n others of the lines being multiplicand-carrying lines for carrying in parallel, n bits of a supplied, n-bit wide digital multiplicand signal ($A_{0:(n-1)}$) that represents a succession of multiplicand values over time;

(c) a second bus having at least six control lines extending along said substrate substantially parallel to the lines of the first bus, the at least six control lines being for carrying in parallel a corresponding set of at least six control signals ($I_{a:c}, J_{a:c}$);

(d) first and second pluralities of multiplexer cells, each multiplexer cell including:
  (d.1) an output node, and
  (d.2) at least three switching devices respectively controlled by control signals on a corresponding at least three control lines of the second bus, the at least three switching devices having inputs respectively coupled to two or more lines of the first bus, one of said two or more lines being a constant-maintaining line and another of said two or more lines being a multiplicand-carrying line, the at least three switching devices further having outputs commonly coupled to the cell output node;

(e) an adder/subtractor unit having a first term receiving port operatively coupled to the output nodes of the first plurality of multiplexer cells, a second term receiving port operatively coupled to the output nodes of the second plurality of multiplexer cells, and a sign-defining input, the adder/subtractor unit outputting a result signal representing, for a first state of the sign-defining input, a sum of first and second term signals respectively output by said pluralities of multiplexer cells, and representing, for a second state of the sign-defining input, a difference between the first and second term signals; and (f) a mapping control unit, operatively coupled to the at least six control lines and to the sign-defining input, for defining states of the corresponding at least six control signals ($I_{a:c}, J_{a:c}$) and the sign-defining input so that the result signal output by the adder/subtractor unit represents a succession over time of rational multiples of the succession of multiplicand values represented by the supplied, n-bit wide digital multiplicand signal ($A_{0:(n-1)}$).

26. An integrated circuit according to claim 25, wherein:
first and second conductor layers are provided, one overlapping the other, on said substrate; and
the first and second buses are provided, one overlapping the other, in the respective first and second conductor layers.

27. An integrated circuit according to claim 26 wherein the adder/subtractor unit includes a carry-ripple adder.

28. An integrated circuit according to claim 26 wherein the switching devices are pass transistors defined in the substrate under the first and second buses.

29. An integrated circuit according to claim 25 wherein the mapping control unit controls the states of the control signals ($I_{a:c}, J_{a:c}$) and the sign-defining input so that the result signal output by the adder/subtractor unit represents a succession over time of rational multiples each having the form, $A \cdot P/Q$, where Q is an integer equal to two raised to an integer power ($Q=2^j$) and P is an integer selected from a series of integers, each P/Q ratio being predefined for a corresponding one or more of the succession of multiplicand values represented by the supplied, n-bit wide digital multiplicand signal ($A_{0:(n-1)}$).

30. An integrated circuit according to claim 25 wherein the switching devices include transistors defined in the substrate and wherein the adder/subtractor unit includes, for each multiplexer cell, a series-connected pair of inverters also defined in the substrate and coupled to the switching device transistors of the corresponding multiplexer cell.

31. An integrated circuit according to claim 30 wherein the adder/subtractor unit includes, for each multiplexer cell, a feedback switch coupling an output of one of the corresponding series-connected pair of inverters to an input of the other of the series-connected pair of inverters to thereby define a data latch for storing the output of the corresponding cell output node.

32. A circuit for carrying out machine-implemented multiplication of respective values represented by a supplied, n-bits wide, multiplicand signal (A) and by a physically real or inferentially defined multiplier signal (B), said circuit comprising:
(a) a plurality of barrel shifting units for providing bit significance translation of the multiplicand signal (A);
(b) a summing unit operatively coupled to the barrel shifting units for adding or subtracting output signals of the barrel shifting units to each other or to a supplied constant in accordance with a supplied control signal; and
(c) a mapping control unit operatively coupled to the barrel shifting units and the summing unit for controlling the barrel shifting units and the summing unit such that the summing unit produces a result signal that is at least approximately representative of the value of the multiplicand signal (A) multiplied by the value of the multiplier signal (B).

33. A multiplication circuit according to claim 32 wherein the multiplicand signal (A) is applied in parallel to the plural barrel shifting units.

34. A multiplication circuit according to claim 32 wherein each barrel shifting unit responds to a shift control signal (I,J) supplied to that shifting unit from the mapping control unit and outputs a corresponding term signal (T) representing either a zero or the multiplicand signal (A) shifted by a number of bits defined by the shift control signal (I,J).

35. A multiplication circuit according to claim 34 wherein resulting term signals ($T_i$, $T_j$) of respective barrel shifting units are applied to the summing unit for producing a result signal (C) representing sums or differences of the term signals and wherein the mapping control unit determines whether the summing unit performs an addition or a subtraction for each said term signal.

36. A multiplication circuit according to claim 32 wherein mapping logic is provided within the mapping control unit for causing the result signal (C) to be a binary-coded signal representing a product of the multiplicand signal (A) and the multiplier signal (B).

37. A function generating apparatus for generating an output signal (C) that at least approximately represents a function output value C=f(A,B) taken out of a predefined range of output magnitudes, where f(A,B) represents a predefined function of first and second input values, A and B, said apparatus comprising:
(a) first signal receiving means for receiving a first digital signal (A) representing the first input value, A;
(b) first approximating-term generating means, operatively coupled to the first signal receiving means and responsive to a supplied first control signal, for generating in response to the first digital signal (A) and the first control signal, a first term signal representing either a predefined constant or one of a first finite set of values distributed across said predefined range of output magnitudes, said first finite set of values being distributed such that the gap between any two adjacent ones of the distributed first finite set of values is no more than a first predefined maximum gap amount;

(c) second approximating-termgenerating means, operatively coupled to the first signal receiving means and responsive to a supplied second control signal, for generating in response to the first digital signal (A) and the second control signal, a second term signal representing either a predefined constant or one of a second finite set of values distributed across a predefined second range of magnitudes, said second range being approximately at least as wide as said first predefined maximum gap amount;

(d) term combining means, operatively coupled to the first and second approximating-term generating means, and responsive to a supplied third control signal, for combining the first and second term signals and producing therefrom, in response to the third control signal, a result signal representative of one of a third finite set of values distributed across said predefined range of output magnitudes, the third finite set of values being distributed such that the gap between any two adjacent ones of the distributed third finite set of values is substantially less than the first predefined maximum gap amount and such that, for a majority of the values in the first finite set, each of the same values found in the third finite set is surrounded in a generally symmetric fashion by neighboring other values of the third finite set; and (e) mapping means, operatively coupled to the first approximating-term generating means, and to the second approximating-term generating means, and to the term combining means, for respectively supplying said first, second, and third control signals such that the result signal is at least approximately representative of the function output value C=f(A,B) for the case where the second input value B is either defined by second digital signal (B) applied to the mapping means, or inferred from the first, second, and third control signals supplied by the mapping means.

38. A function generating apparatus according to claim 37 wherein the termcombining means includes means for either adding or subtracting the first and second term signals in response to the third control signal.

* * * * *